United States Patent [19]
Capps et al.

[11] Patent Number: 5,583,542
[45] Date of Patent: Dec. 10, 1996

[54] METHOD FOR DELETING OBJECTS ON A COMPUTER DISPLAY

[75] Inventors: Stephen P. Capps; Ernest H. Beernink, both of San Carlos, Calif.

[73] Assignee: Apple Computer, Incorporated, Cupertino, Calif.

[21] Appl. No.: 70,094

[22] Filed: May 27, 1993

Related U.S. Application Data

[63] Continuation-in-part of Ser. No. 888,741, May 26, 1992, abandoned.

[51] Int. Cl.$^6$ ................................................. G09G 3/00
[52] U.S. Cl. ........................... 345/173; 345/179; 382/186
[58] Field of Search ..................................... 345/173–179, 345/180, 182, 156, 104; 178/18, 19; 364/927.2, 927.6; 382/13, 57, 59, 186, 187, 309, 310, 313, 314, 315, 316; 434/162, 155

[56] References Cited

U.S. PATENT DOCUMENTS

| | | | |
|---|---|---|---|
| 4,633,436 | 12/1986 | Flurry | 345/179 |
| 4,739,317 | 4/1988 | Berry et al. | 340/723 |
| 4,812,832 | 3/1989 | Oishi et al. | 340/709 |
| 4,992,630 | 2/1991 | Mletzko | 178/18 |
| 5,038,382 | 8/1991 | Lipscomb | 382/13 |
| 5,050,219 | 9/1991 | Maury | 382/186 |
| 5,121,442 | 6/1992 | Togawa et al. | 382/13 |
| 5,148,155 | 9/1992 | Martin et al. | 345/173 |
| 5,157,737 | 10/1992 | Sklarew | 382/13 |
| 5,272,470 | 12/1993 | Zetts | 345/173 |
| 5,313,051 | 5/1994 | Brigida et al. | 345/173 |

FOREIGN PATENT DOCUMENTS

| | | | |
|---|---|---|---|
| 0383304 | 2/1990 | European Pat. Off. | |
| 0065679 | 3/1989 | Japan | 382/13 |

OTHER PUBLICATIONS

<Taking Pen In Hand> by CMP Publication Inc. Feb. 1992.
<Message Pad 110 Handbook> by Apple Computer Inc. 1994, pp. 92–97.
"Apple banking on Newton's brain" (O'Connor) San Jose Mercury News, Apr. 22, 1992.
Macintosh User's Guide (Apple Computer, Inc.) 1991, pp. 47–50.

*Primary Examiner*—Ulysses Weldon
*Assistant Examiner*—Lun-Yi Lao
*Attorney, Agent, or Firm*—Hickman Beyer & Weaver

[57] ABSTRACT

A method for deleting objects displayed on the screen of a display assembly of a pointer based computer system is described. The method includes the steps of detecting a pointer created stroke and processing the stroke for gesture recognition. Thereafter, the processed stroke is checked to determine whether it meets the path definition requirements of a scrub gesture. In another step, a determination is made as to whether an object displayed on the screen has been selected. If an object is selected and the processed stroke meets the requirements of a scrub gesture, the selected object is deleted. In a preferred embodiment of the invention, the selected object determining step includes the substep of determining whether any objects were preselected at the time the scrub gesture was made. When no suitable objects are preselected, a determination is made as to whether the scrub gesture substantially overlaps a displayed object. If a displayed object is substantially overlapped, it is selected for deletion. In another preferred embodiment, the scrub gesture determining step includes the substep of determining whether the number of times that the processed stroke changes the direction of its turn angles exceeds a predetermined number, wherein the stroke will not be considered a scrub gesture unless the predetermined number of direction changes is exceeded. In yet another preferred aspect of the invention, the stroke processing step includes the substeps of defining a multiplicity of corners in the stroke, removing selected corners that are associated with segments that are shorter than a designated length, and removing selected corners that have an associated turn angle that is less than a predetermined angle.

16 Claims, 19 Drawing Sheets

METHOD FOR DELETING OBJECTS ON A COMPUTER DISPLAY

This application is a Continuation-in-Part of application Ser. No. 07/888,741, filed May 26, 1992 on behalf of Capps and entitled, "Method for Selecting Objects on a Computer Display", which is incorporated herein by reference and is now abandoned.

BACKGROUND OF THE INVENTION

The present invention relates generally to editing images on a computer display screen used in a pointer based computer system. More particularly, a method of deleting displayed objects is described.

The use and popularity of pointer based computer systems, including pen-based, stylus-based, track ball, and mouse driven systems has been increasing dramatically in recent years. This increased popularity is typically attributed to the ease of use of such machines when compared to traditional computing systems that utilize only a keyboard as an input device.

A pen-based computer system is a small, often hand held, computer system in which the primary method for inputting data includes a stylus or "pen". A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides positional information to the computer's central processing unit (CPU). Some display assemblies can also sense the pressure of the stylus on the screen to provide further information to the CPU. When operating as an output device, the display assembly presents computer-generated images on the screen.

The dual-function display assembly of a pen-based computer system permits users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

Besides serving as a notepad, pen-based computers can provide a number of useful functions, such as serving as an address book, an appointment calendar, a to-do list, etc. These functions can be tightly integrated with the operating system of the computer, permitting information input into one function to impact upon another function.

Users of pointer and pen-based computer systems often want to be able to edit objects that are displayed on the screen. These objects can take various forms such as text objects, graphical objects, numerical objects, tabular objects, etc. One very important aspect of editing is deleting certain objects. For example, when word processing, it is often desirable to be able to delete a word, a sentence, or a paragraph. With a graphical object, part or all of the graphic may be selected for deletion.

With both conventional and pen-based computers, deletion is typically accomplished by having the user first select the objects to be deleted and thereafter having the user issue a delete command. By way of example, in pointer based systems, the selection step often involves pointing to the object to be deleted and then "clicking" on the object by pressing a mouse button or the like. After the object has been selected, a delete command is entered which may take a variety of forms such as a keyboard entry, or the selection of a delete operation from a menu. The resulting operation is usually a two or more step process which, while being relatively quick and easy from the user's standpoint, can still be improved upon. The object of the present invention is to provide a method of deleting an object that includes a user interface that is intuitive, easy to use and simple to operate.

SUMMARY OF THE INVENTION

Accordingly, it is an object of the present invention to provide a method of deleting objects that includes a one-step user interface which is particularly well suited for use in pointer-based computer systems To achieve the foregoing and other objects and in accordance with the purpose of the present invention, a method for deleting objects displayed on the screen of a display assembly of a pointer based computer system is described. In its general aspects, the method includes the steps of detecting a pointer created stroke and processing the stroke for gesture recognition. Thereafter, the processed stroke is checked to determining whether it meets the path definition requirements of a scrub gesture. In another step, a determination is made as to whether an object displayed on the screen has been selected. If an object is selected and the processed stroke meets the requirements of a scrub gesture, the selected object is deleted.

In a preferred embodiment of the invention, the selected object determining step includes the substep of determining whether any objects were preselected at the time the scrub gesture was made. When no suitable objects are preselected, a determination is made as to whether the scrub gesture substantially overlaps a displayed object. If a displayed object is substantially overlapped, it is selected for deletion. In a further preferred embodiment, substantial overlap is found when the area of a bounding box that encompasses the stroke is compared to the area of a second bounding box that encompasses a specific displayed object. Specifically, the stroke is considered to substantially overlap an object if the bounding box of the stroke covers more than a predetermined percentage of the bounding box of the object. In a still further preferred aspect of the selection step, objects displayed on the screen are checked in descending order of priority, wherein if an object on a given level of priority is determined to be substantially overlapped, objects having lower levels of priority will not be checked for substantial overlap.

In an alternative preferred embodiment of the invention, the scrub gesture determining step includes the substep of determining whether the number of times that the processed stroke changes the direction of its turn angles exceeds a predetermined number, wherein the stroke will not be considered a scrub gesture unless the predetermined number of direction changes is exceeded. In a further preferred embodiment, the scrub gesture determining step further includes the steps of calculating the turn angle of each corner and adding the sum of the turn angles of all of the sequential corners that turn in the same direction. If any sum of the turn angles of all of the sequential corners that turn in the same direction exceeds a predetermined total, the stroke will not be considered a scrub gesture.

In another alternative preferred aspect of the invention, the stroke processing step includes the substeps of defining a multiplicity of corners in the stroke, removing selected corners that are associated with segments that are shorter than a designated length, and removing selected corners that have an associated turn angle that is less than a predetermined angle. In a further preferred embodiment, the corner defining step includes an iterative end-point fits process. In another further preferred embodiment, the short segment corner removing step requires that when the distance between adjacent corners is less than the designated length, one of the corners associated with the short line segment will be eliminated. The removed corner is preferably the corner having a smaller turn angle associated therewith will be eliminated.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

The present invention is particularly well suited for pointer based computer systems such as the pen-based, stylus-based and mouse-based systems that are currently popular. For the purposes of illustration, the invention will be described in connection with a pen-based system.

Figure 1:
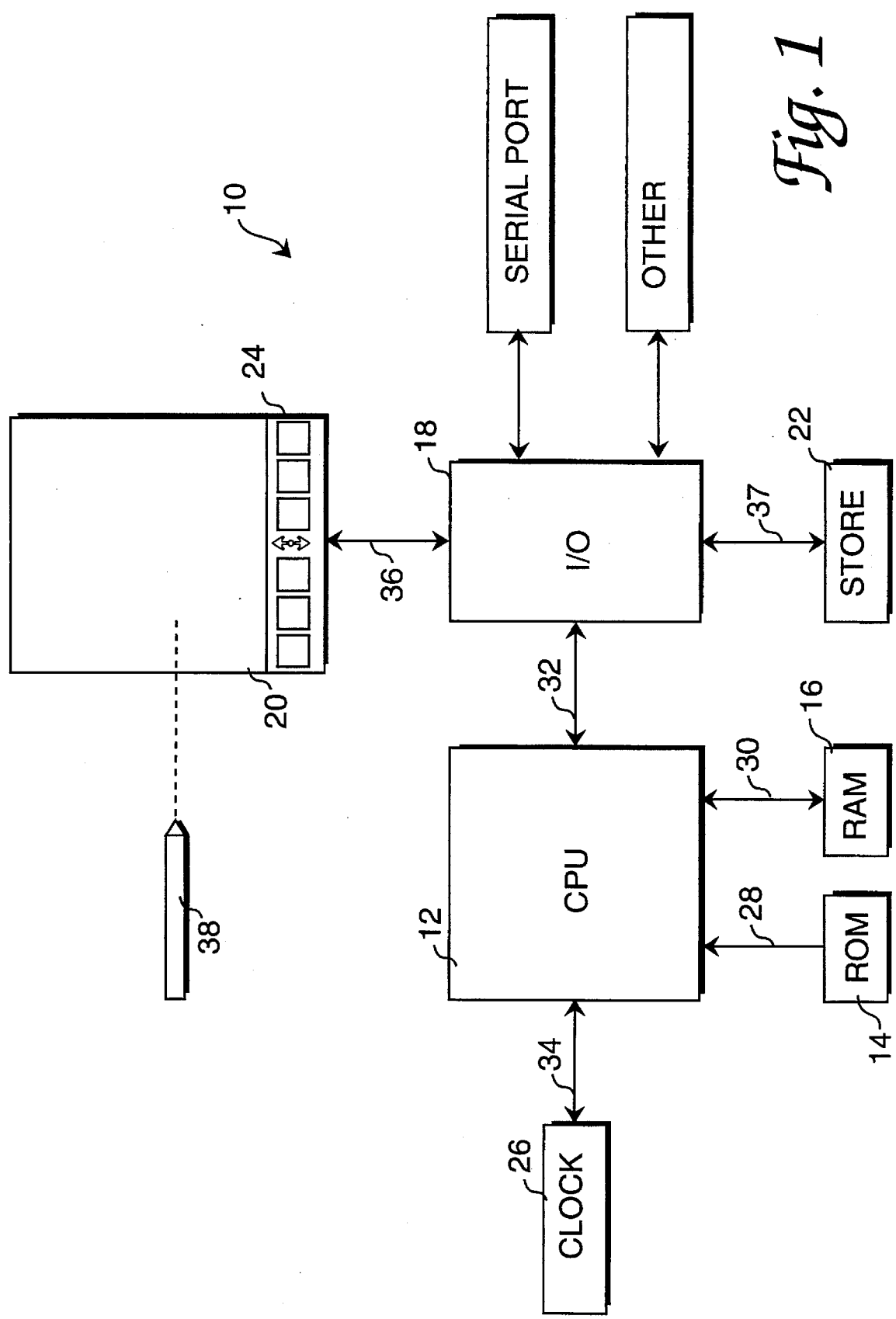
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24 arranged as an array of input buttons, a serial port, another I/O port and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28. ROM 14 contains the basic operating system for the pen-based computer system 10. CPU 12 is connected to RAM 16 by a bidirectional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bidirectional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, the keypad 24, a serial port and an I/O port. Keypad 24, the serial port, and the I/O port are each coupled to the I/O circuitry 18 by a suitable data bus.

Clock 26 provides a series of clock pulses and is typically coupled to an interrupt port of CPU 12 by the data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises "button" areas provided at the bottom edge of the membrane which covers the LCD display. When the "buttons" are depressed, the membrane senses the pressure and communicates that fact to the CPU 12 via I/O circuitry 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, or nonvolatile memory such as flash memory or battery backed RAM, PC-data cards or the like.

In operation, information is input into the pen-based computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. X & Y) coordinates of a pixel of the screen of display assembly 20 over which the tip of the stylus is positioned. For the purposes of recognition, the display assembly may return position information on a smaller scale than pixel-size. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

The aforementioned process produces the illusion that the stylus 38 has an "ink" which appears on the screen of the display assembly 20. Therefore, as used herein, the terms "inking" and "ink" will refer to the process and the result, respectively, of displaying a line or other indicia on the screen of display assembly 20 in response to the movement of stylus 38 on the screen.

Figure 2:
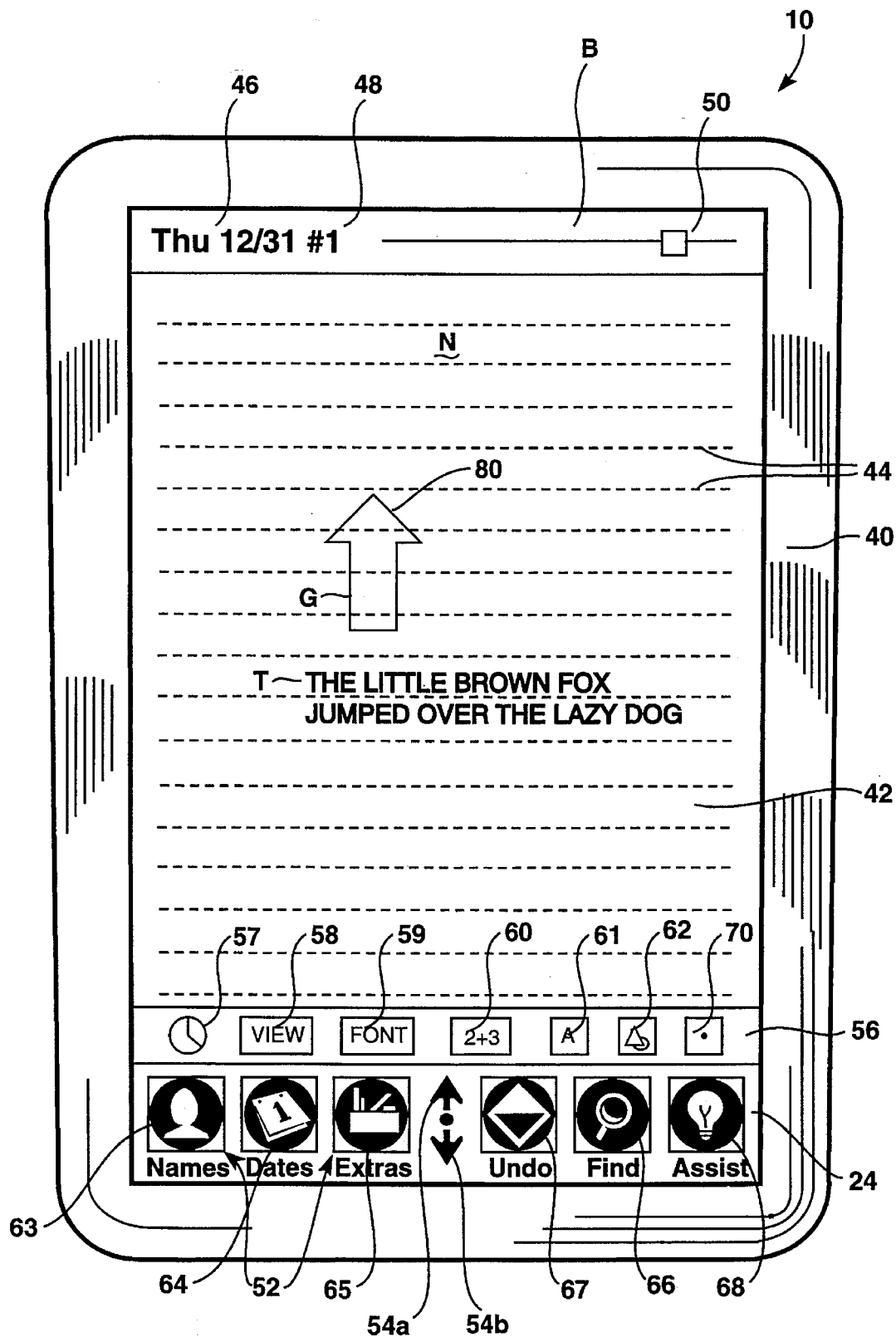
FIG. 2 is a top plan view of the screen, case and keypad of the computer system of FIG. 1 with graphical and text objects being displayed on the screen.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen-based computer system 10 displays on screen 42 an initial note area N including a breaker bar B and a number of guidelines 44. The breaker bar B preferably includes the date of creation 46 of the note N, a note number 48 and a "router" button 50 which allows notes to be dispatched to a printer, facsimile, the trash, etc. The optional guidelines 44 aid a user in entering text, graphics, and data into the pen-based computer system 10. The screen of FIG. 2 is shown displaying textual material T as well as a graphic depiction of an arrow G.

In this preferred embodiment, the keypad 24 is not a part of the screen 42 but rather, is a permanent array of input buttons coupled to the CPU 12 by I/O circuitry 18. Alternatively, the keypad 24 could comprise "soft buttons" generated at a convenient location on the screen 42, in which case a "button" would be activated by touching the stylus to the screen over the image of the button. The keypad 24 preferably includes a number of dedicated function buttons 52, a pair of scroll buttons 54a, 54b and center button 55. The operation of the scroll buttons 54a and 54b, and other aspects of computer system 10 are discussed in greater detail in co-pending U.S. patent application Ser. No. 07/868,013, filed Apr. 13, 1992 on behalf of Tchao et al. and entitled, "Method for Manipulating Notes on a Computer Display". That application is assigned to the assignee of the present application and its disclosure is hereby incorporated by reference in its entirety. The function buttons 52 include an address button 63, a calendar button 64, a drawer button 65, a find button 66, an undo button 67, and an assist button 68.

As described in the above referenced application by Tchao et al., in one suitable embodiment of the present invention, a notepad application program is launched when the computer system 10 is turned on. The address button 63 can then be used to launch an address book application program. That is, when the address button 63 is depressed, a suitable address book application program is opened and a suitable address book dialog box is displayed on screen 42. Similarly, the calendar button 64 launches a calendar application program when depressed.

The screen illustrated in FIG. 2 is referred to as the "notepad", and is an application program running under the operating system of the pen-based computer system 10. In this preferred embodiment, the notepad is a special or "base" application which is always available beneath higher level applications. The notepad application, like other applications, runs within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 57, a view button 58, a font button 59, a formulas button 60, a text button 61, a graphics button 62, and a nib button 70. Co-pending application Ser. No. 07/976,970, filed Nov. 16, 1992 on behalf of Foster et al., entitled, "Status Bar for Application Windows", and assigned to the assignee of the present invention describes the operation of the status bar, and is hereby incorporated herein by reference in its entirety.

The "Find" button 66 is used to initiate a search for information. The undo button 67 will undo the latest user action when depressed. The assist button 68 gives the user access to a help menu which is designed to provide operating instructions to the user that may be helpful when the user is unsure of how to operate the computing system.

A "drawer", which is opened by pressing the drawer button 65 is used to store other application programs, tools, access buttons to external ROM cards, communications applications and other items that can be utilized by the user. When the drawer is "opened", a drawer dialog box is displayed on the screen 42. When the dialog box is opened, the user can then launch any application stored therein merely by tapping on the associated icon that is displayed within the drawer dialog box. Thus, the drawer may serve as a receptacle for various graphics applications programs and the icons serve as "soft buttons" which may be activated by tapping the screen at a location corresponding to the displayed position of the icon. Of course, in alternative embodiments, the applications that are accessed by keypad buttons can be varied widely. For example, additional keys could be added, existing keys removed, and/or the above described keys could be used to launch different applications.

It is noted that within this application reference will often be made to "tapping", "clicking on", "pressing" or otherwise selecting an object. These words are intended to interchangeably refer to the act of selecting the object. The term tapping is generally used in reference to the physical act of touching the stylus of a pen-based computing system to the screen and shortly thereafter lifting the stylus from the screen (i.e. within a predetermined period of time) without moving the stylus any significant amount (i.e. less than a predetermined amount, as for example six pixels). This is a typical method of selecting objects in a pen-based computing system. The term "clicking on" is intended to be broader in scope and is intended to cover not only tapping, but also the action of selecting an object using a button associated with a mouse or track ball as well as the selection of an object using any other pointer device.

When a line that forms a portion of a graphic object is created, it is typically stored in a compact form. That is using the minimum number of points or "vertices" that define the line. For example, when a straight line is formed, the critical information is the location of the end points of the line. As long as the location of the end points are known, a straight line can be readily drawn therebetween. Thus, the straight line needs two vertices. Similarly, a triangle can be formed with only the knowledge of the location of its three corners. Other polygons can similarly be recognized by knowing the location of their corner points, as well as the identity of their neighboring corners. Similarly, arcs, ovals, circles and other standard geometric shapes can be identified through the use of vertices. Therefore, when such graphical items are stored, the information that is really stored is the location of its vertices. Accordingly, as is well known to those skilled in the art, various graphical editing operations, such as resizing, rotating and moving can be accomplished merely by conducting a simple mathematical transformation of the vertices and redrawing the revised graphic.

The scrubbing user interface of the described embodiment as seen by the user will be described initially. A graphic object can be drawn using the stylus 38 to draw a desired image using the described inking process. If desired, suitable recognition software can be used to straighten lines, round arcs, etc. Alternatively, specific application programs can be used to generate graphics.

In order to delete an object or a portion of an object, the stylus is used to make a scrub gesture. In the described embodiment, zig-zagging lines as seen in FIGS. 12(a–c) having at least three turns are treated as potential scrub gestures. In order to qualify as a scrub gesture, the stroke must be continuous and not have any significant loops therein such as the loops in the stroke shown in FIG. 12(d). The stroke must also not double back on itself. That is, it must proceed substantially in one direction (referred to as the longitudinal direction herein). In alternative embodiments of the invention, the relative longitudinal spacing of the peaks and valleys may be required to be within a suitable range relative to their amplitude.

Figure 12A:
FIG. 12(a) illustrates a valid scrub stroke that may be drawn by a user.
Figure 12B:
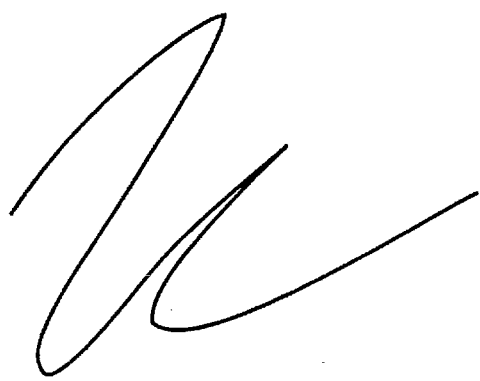
FIG. 12(b) illustrates another valid scrub stroke that may be drawn by a user.
Figure 12C:
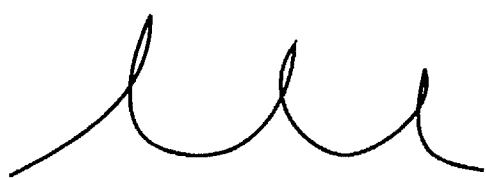
FIG. 12(c) illustrates yet another valid scrub stroke that may be drawn by a user.

In the described embodiment, there is no requirement that the teeth of the scrubbing gesture be substantially the same height. This was chosen because experiments have shown that when ordinary users attempt to make scrub gestures, diminishing strokes such as those shown in FIG. 12(c) are frequently made, especially when the user is working quickly. Therefore, in the described embodiment, a scrub gesture having a diminishing amplitude such as the stroke shown in FIG. 12(c) is sufficient. However, it should be appreciated that in alternative embodiments, a requirement that insures that the stroke amplitude does not vary by more than a predetermined amount in order to qualify as a scrub gesture could be readily added. Although the prescribed variation may be varied a great deal in accordance with the needs of a particular system, in such an embodiment, permissible amplitude variations on the order of the amplitude of the smallest oscillations would be suitable.

When a stroke has been made that has the general appearance of a scrub gesture, the computer system determines whether any of the displayed objects are selected. If one or more objects were already selected before the scrub gesture was made, the selected object(s) will be deleted so long as the scrub gesture is made relatively close to the selected object(s). On the other hand, if nothing is preselected, the scrub gesture must be made in a position that substantially overlaps any object(s) to be deleted.

Figure 3A:
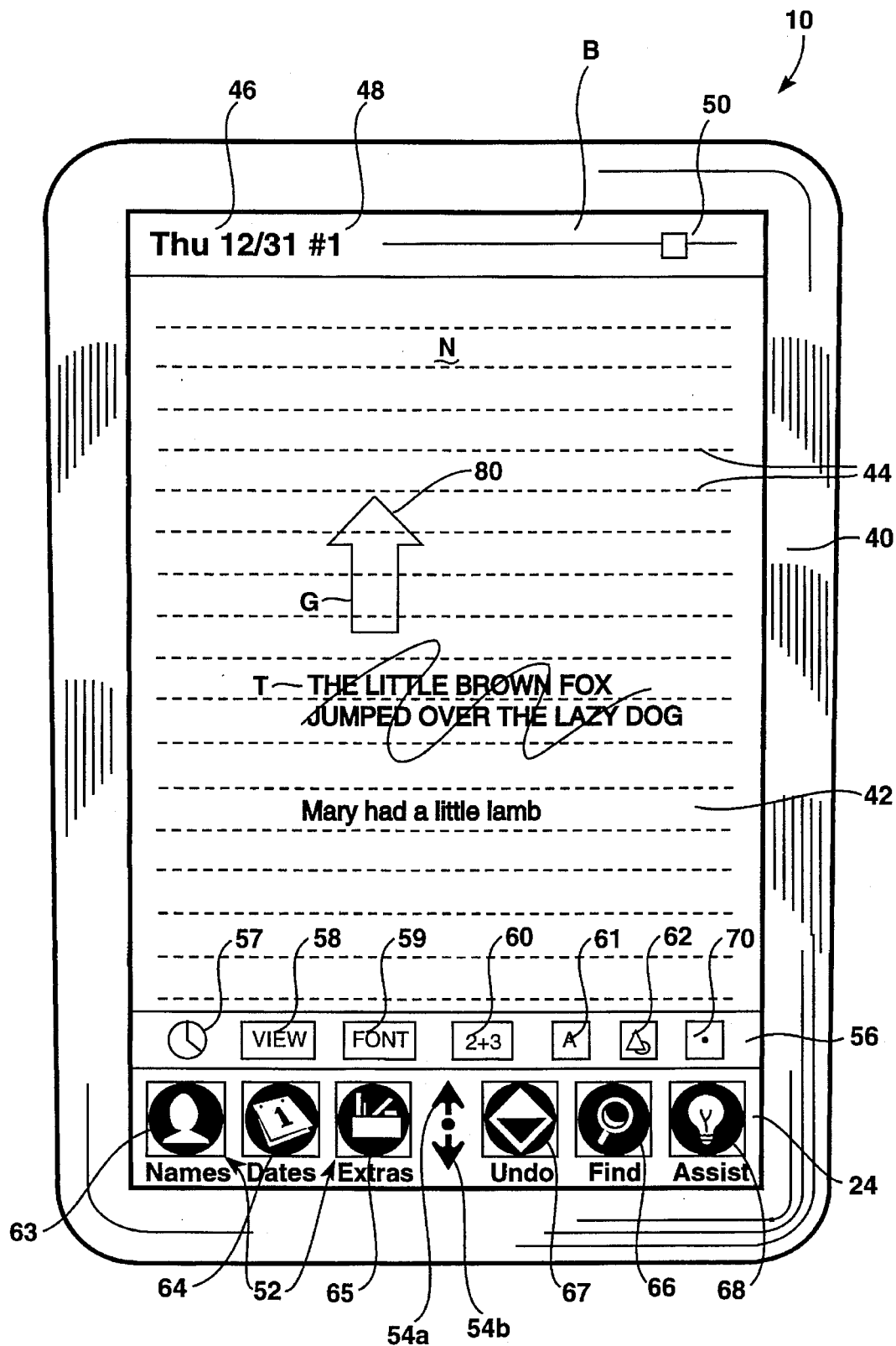
FIG. 3(a) illustrates the screen display of FIG. 2 with a scrub gesture made over one sentence of the textual matter.
Figure 3B:
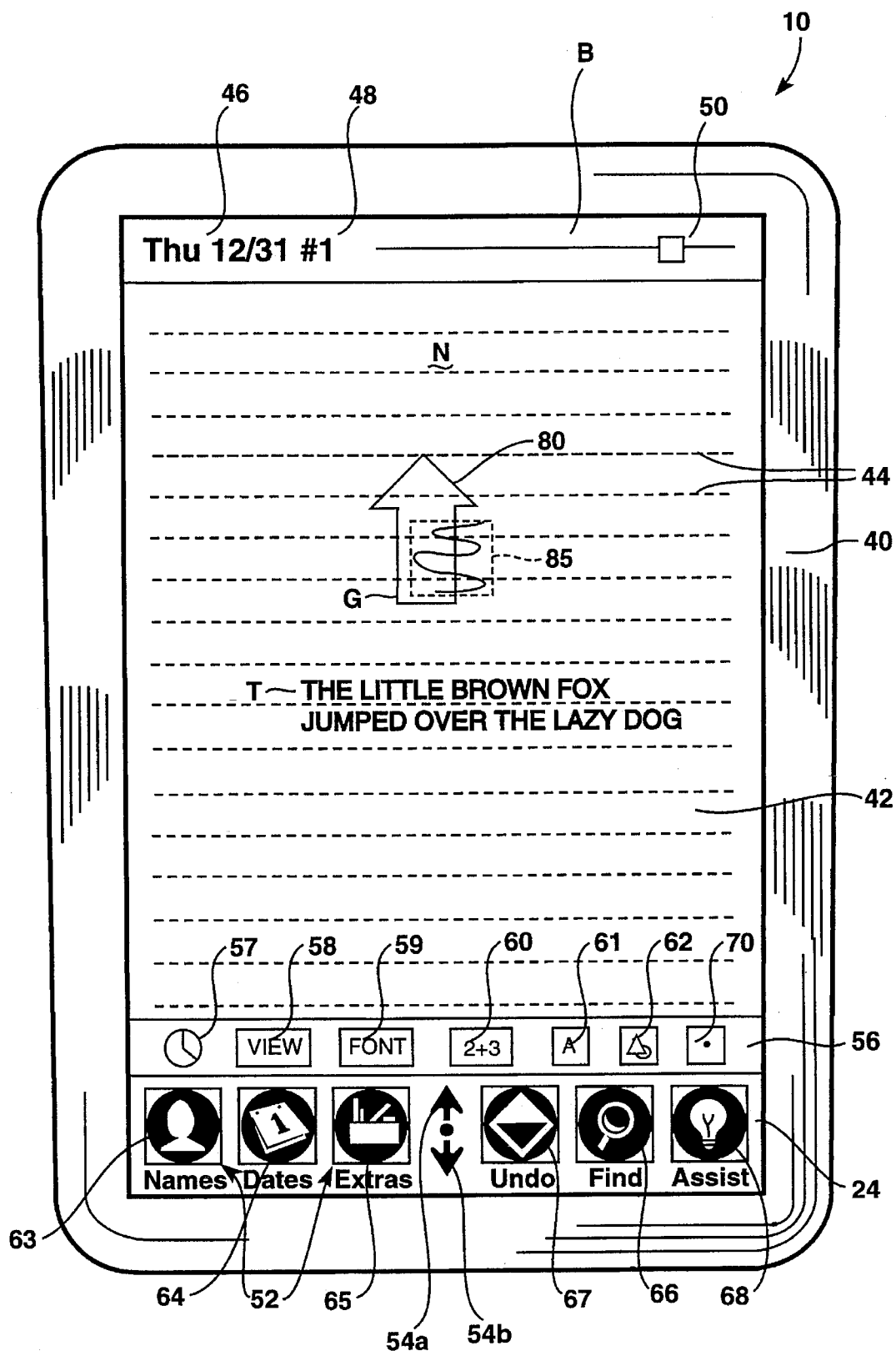
FIG. 3(b) illustrates the screen display of FIG. 2 with a scrub gesture made over one side of the graphical object.
Figure 3C:
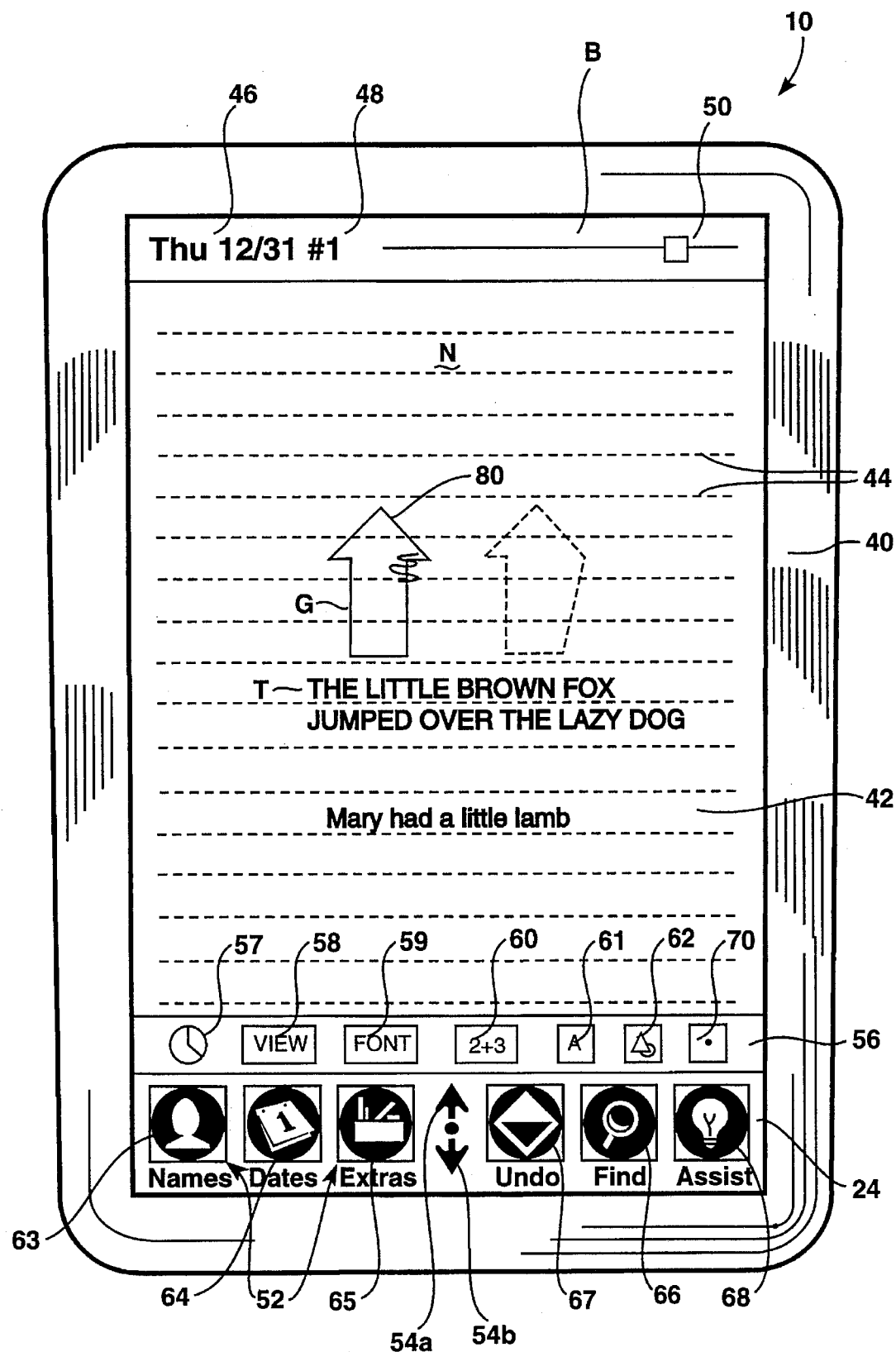
FIG. 3(c) illustrates the screen display of FIG. 2 with a scrub gesture made over one vertex of the graphical object.

A suitable method for determining substantial overlap is to look at a rectilinear "bounding box" (STROKE BOUNDS) that encloses the stroke that forms the scrub gesture and determining whether it substantially overlaps a rectilinear bounding box (OBJECT BOUNDS) of an object displayed on the screen. The amount of overlap between the bounding boxes that is considered "substantial" may be set at a given percentage that is suitable in view of the needs of the system. A representative number that has been found to work well is an 80% overlap. That is, in the given example, substantial overlap occurs when the strokes bounding box (STROKE BOUNDS) overlap at least 80% of the boundary of a given object (OBJECT BOUNDS). In an alternate (but not preferred) embodiment of the present invention, if the boundary box of the objects overlaps at least 80% of the stroke's bounding box (STROKE BOUNDS), this too will result in "substantial overlap." Of course, the actual percentage overlap may be varied in accordance with the needs of a particular system. Although there is no need to display the bounding boxes in practice, a representative bounding box 85 of a scrub gesture stroke is shown in FIG. 3(b) for the purposes of illustration.

Turning next to FIGS. 4–11, a suitable method of scrubbing objects displayed on the screen 42 will be described.

The process begins in step 100. Then in step 102, the logic determines whether the stylus has been placed on the screen. If not, the logic waits. In practice, this is typically accomplished by generating a hardware interrupt when the user places the stylus 38 against the screen 42. The hardware interrupt gives control of the CPU 12 to the described routine. Thus, when the stylus 38 is placed on the screen the logic moves to step 104 where the path of the stylus is detected and recorded. In practice, this is accomplished by detecting and accumulating a series of points that define the stroke made by the stylus. After the stroke has been determined, the series of accumulated points that define the stroke are processed to support gesture recognition in step 106 as will be described in more detail below with reference to FIG. 5. After the stroke has been processed for gesture recognition, it is analyzed to determine the nature of the gesture, which includes determining whether the gesture has the appearance of a scrub gesture, as shown in step 108. If the gesture does not have the appearance of a scrub gesture, then the logic moves to step 112 where it interprets the stroke or gesture and proceeds accordingly. Of course, there are a wide variety of meanings that can be attributed to a particular stroke. For example, the stroke may be a writing action, a drawing action, an editing action or a command, any of which may be recognized by suitable recognition software. However, to the extent that such writing, drawing, editing and processing actions do not relate directly to the present invention they will not be described herein.

If in step 108, the logic determines that the stroke does meet the requirements of a scrub gesture, then it moves to step 114 where it determines whether there is a current selection is contacted by the scrub gesture or is located in relatively close proximity to the scrub gesture. By way of example a distance of 0–3 pixels would be suitable. However, this distance can be readily varied and indeed the distance checking step could readily be eliminated in an alternative embodiment. If so, the selected item is deleted in step 115 and accompanying animation, if any, is provided to indicate the deletion has occurred. If not, in step 116, the logic determines whether the scrub gesture has selected any items. In the described embodiment, at least a portion of the scrub gesture must overlap the selected object in order to initiate deletion.

The selection determining step 116 will be described in more detail below with reference to FIG. 11. If the gesture has selected one or more objects, then the logic moves to step 115 where the selected objects are deleted. If the gesture has not selected any objects, then the stroke is not considered a valid scrub gesture and the logic moves on to step 112 where it interprets and processes the stroke as something other than a scrub gesture.

Once the selected object has been deleted in step 115 or the stroke has been otherwise interpreted and processed in step 112, the logic returns to step 102 where it waits for the pen to be returned to the screen or for an alternative interrupt.

Figure 5:
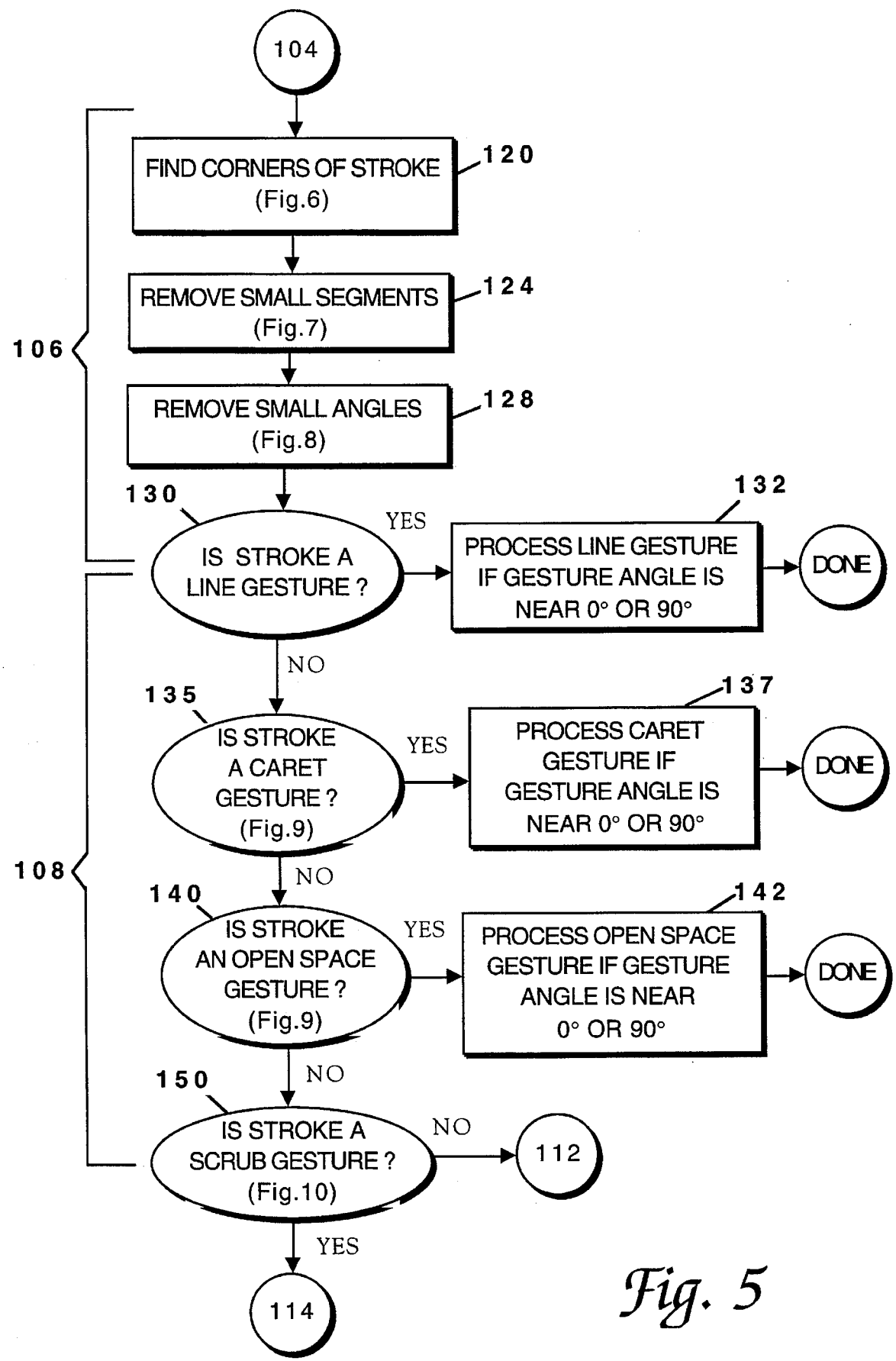
FIG. 5 is a flow diagram illustrating a method of processing stroke information for gesture recognition and determining the nature of the gesture.
Figure 13A:
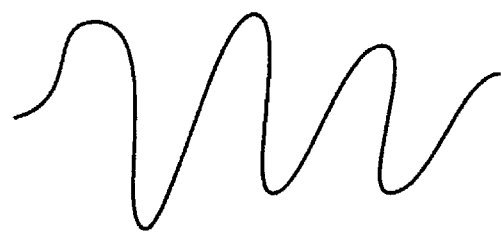
FIG. 13(a) illustrates a representative scrub stroke as drawn by a user.
Figure 13B:
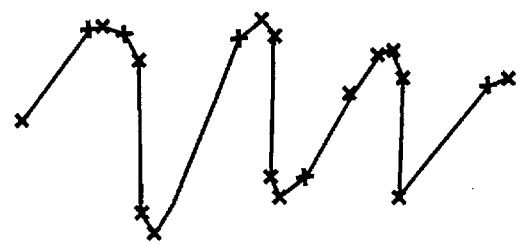
FIG. 13(b) illustrates the scrub stroke shown in FIG. 13(a) after the corner defining step.

Turning next to FIG. 5, suitable methods for the stroke processing for gesture recognition step 106 and the gesture recognition step 108 will be described in more detail. For the purposes of illustration the processing of a stroke as shown in FIG. 13(a) will be described. As seen in FIG. 5, after the stylus 38 is lifted from the screen, the corners of the stroke are first determined in step 120. In effect, the corner defining technique breaks the stroke into a series of straight line segments that approximate the curved path of the inputted stroke. Thus, after the corner defining step, the processed stroke from FIG. 13(a) may look like the stroke shown in FIG. 13(b). In practice, the processed stroke would typically not be displayed. Rather, it is processed as a series of points internally within the CPU 12. The details of the corner defining step 120 will be described in more detail below with reference to FIG. 6.

Figure 13C:
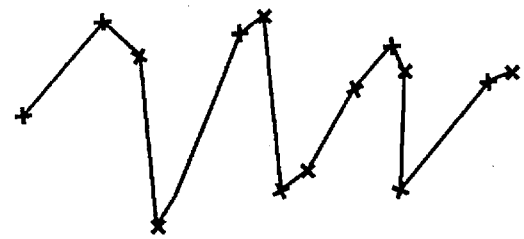
FIG. 13(c) illustrates the processed scrub stroke shown in FIG. 13(b) after the short segment removing step.

After the corners have been defined, any line segments that are shorter than a predetermined threshold length are removed by merging them with an adjacent segment. This small segment removing step 124, will be described in more detail below with reference to FIG. 7. Once the small segments have been removed from the processed stroke shown in FIG. 13(b), the processed stroke may take the appearance shown in FIG. 13(c).

Figure 13D:
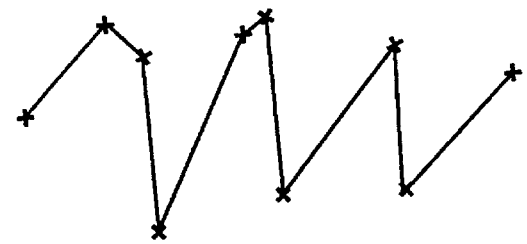
FIG. 13(d) illustrates the processed scrub stroke shown in FIG. 13(c) after the small turn angle removing step.

After the short segments have been removed in step 124, any corners which create a turn that is less than a predetermined threshold turn angle is eliminated in step 128. The small turn angle corner removing step will be described in more detail below with reference to FIG. 8. Once the corners having small turn angles have been removed, the processed stroke shown in FIG. 13(c) may take the appearance of the stroke shown in FIG. 13(d).

Figure 12D:
FIG. 12(d) illustrates a stroke that includes loops therein that would be invalid in the described embodiment of the invention.

By merging the small segments with adjacent segments and removing corners having small turn angles, the system processes the user input into a form that is suitable for gesture recognition. In applicant's experience, these steps greatly improve the system's reliability and ease of use. The reason is that in the described embodiment, a zig-zagging line is used as a scrub gesture. To differentiate the scrub gesture from other gestures, certain criteria has to be made as set forth above. However, as will be appreciated by those familiar with pen-based input systems, the "handwriting" of most users is not particularly neat. Therefore, it is important to recognize a variety of different motions as valid scrub gestures. By way of example, FIGS. 12a–12c show a variety of strokes that users are likely to make when intending to input a scrub gesture. As noted in FIG. 12c, small loops are tolerated. Larger loops, such as in the word "an" of FIG. 12d are not tolerated and will not be recognized as a scrub gesture. The applicants have found that by processing the strokes in the described manner, the system has a good degree of tolerance for variations in the handwriting of a variety of users.

After the original stroke has been processed into a gesture recognizable form in steps 120–128, the logic moves to step 130 where it determines whether the stroke is a line gesture. This is accomplished by checking whether there are just two points in the processed stroke. If the stroke has just two processed points, then the gesture is processed as a line in step 132. A line gesture can be used to designate a variety of operations whose functions may vary based upon the angle of the line. However, since they are not directly related to the scrubbing gesture, they will not be described in detail herein.

If the stroke has more than two processed points, then the logic moves to step 135 where it determines whether the stroke is a caret gesture. If so, the caret gesture is processed in step 137. If not the logic determines whether the stroke is an open space gesture. If the stroke is an open space gesture, then the gesture is processed in step 142. If not, the logic moves to step 150 where it determines whether the stroke is a scrub gesture.

The caret and open space gesture determining steps 130 and 135 are described in more detail below with reference to FIG. 9. If a caret is entered in text and is at an appropriate angle, a single space is inserted into the text between the letters that are divided by the caret. Step 137. After the space has been inserted, the logic returns to step 102 to await the next user input. If an open space gesture is entered and is at an appropriate angle in step 142, an opening is formed between the objects divided by the caret portion of the open space gesture in the direction indicated by the trailing line portion of the gesture.

If the stroke does not take the form of a line gesture, a caret gesture, or an open space gesture, then in step 150, the logic determines whether it takes the form of a scrub gesture. If so, the logic proceeds to step 114 (in FIG. 4), where it determines whether there are any selected screen object(s). On the other hand, if the stroke does not meet the requirements of a scrubbing gesture, then the logic moves to step 112 (in FIG. 4), where it interprets and processes the stroke which has been determined not to be a scrubbing operation.

Figure 6:
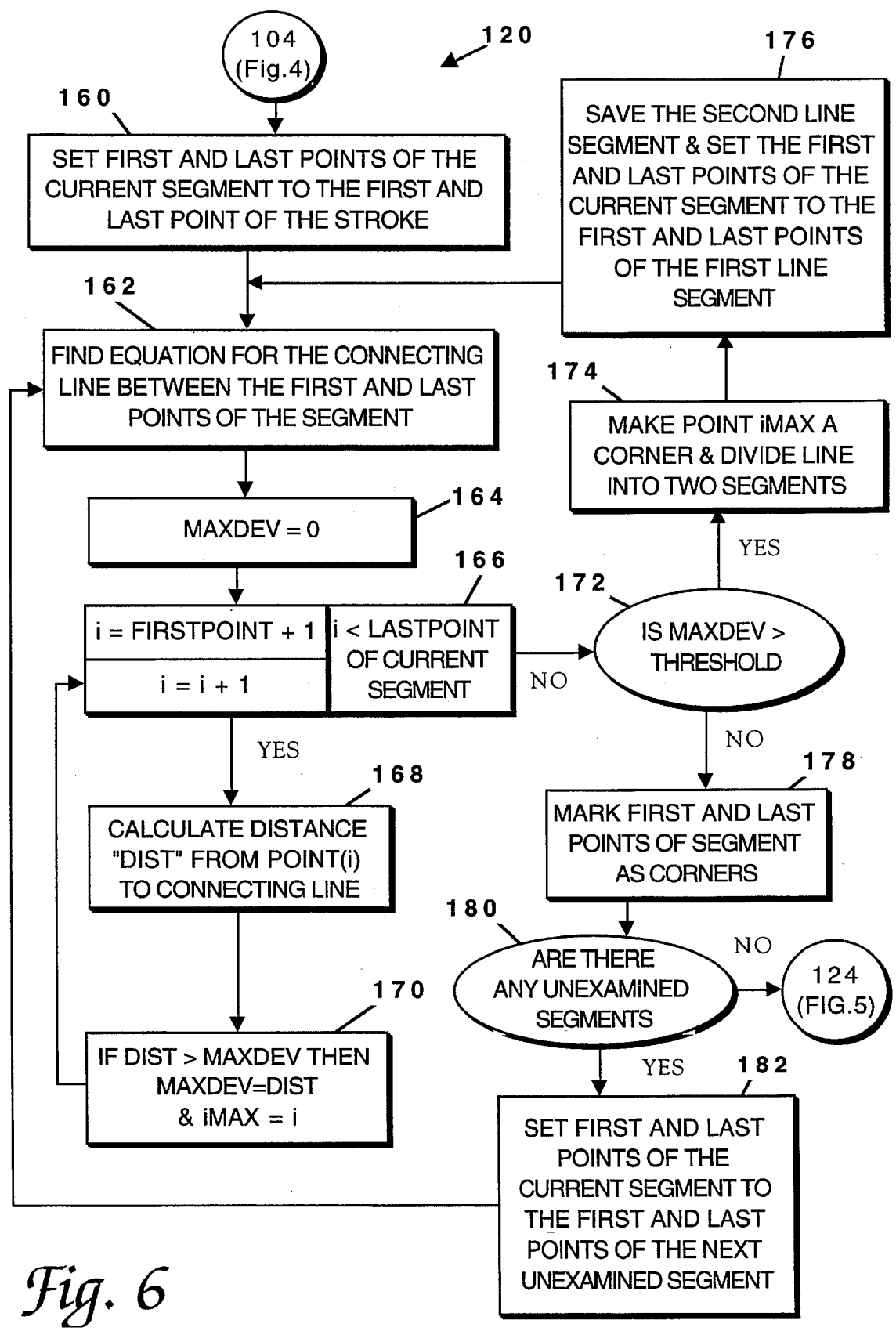
FIG. 6 is a flow diagram illustrating a method of determining the corners of a stroke to facilitate gesture recognition.
Figure 7:
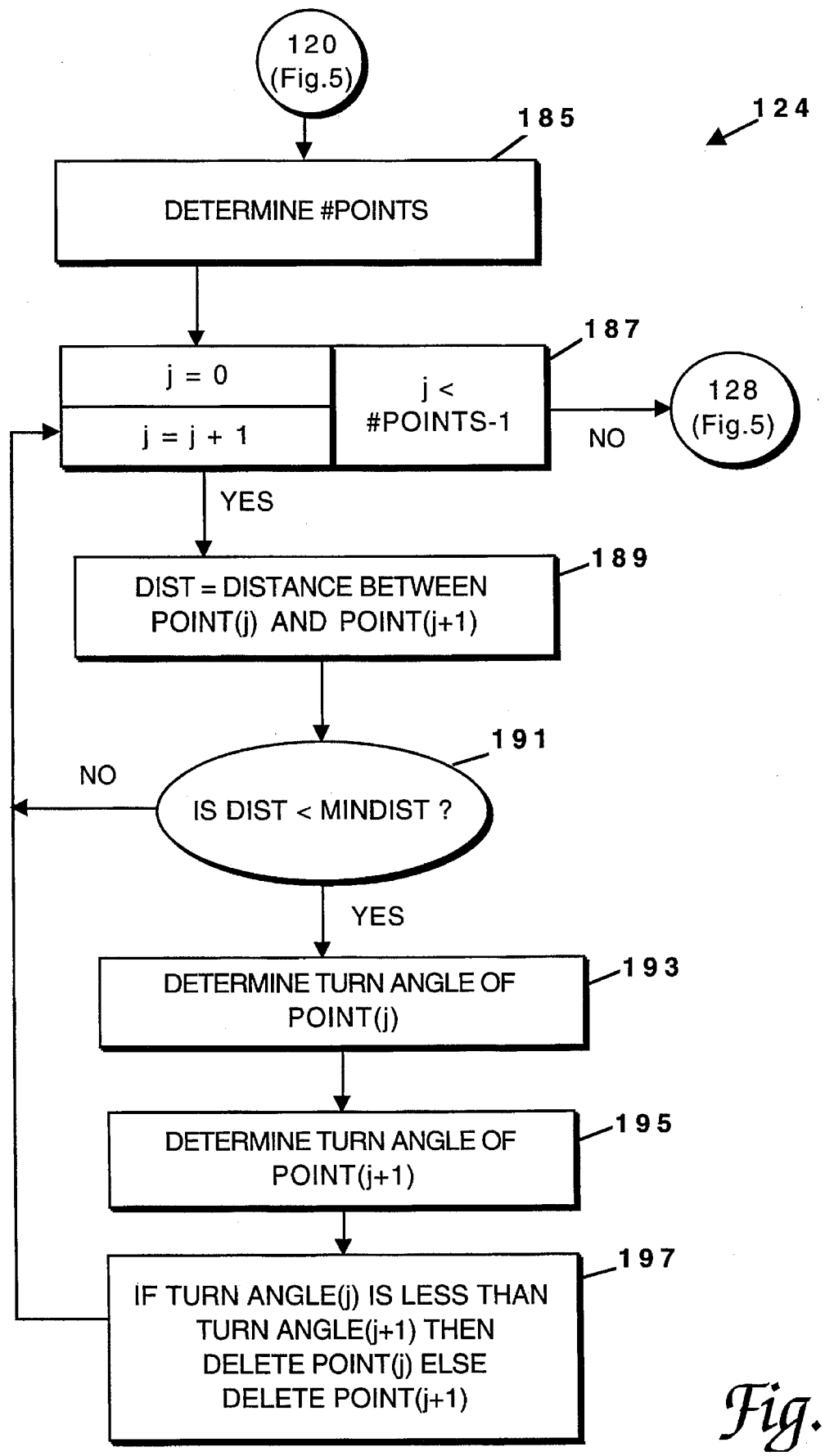
FIG. 7 is a flow diagram illustrating a method of removing small line segments from a stroke to facilitate gesture recognition.
Figure 8:
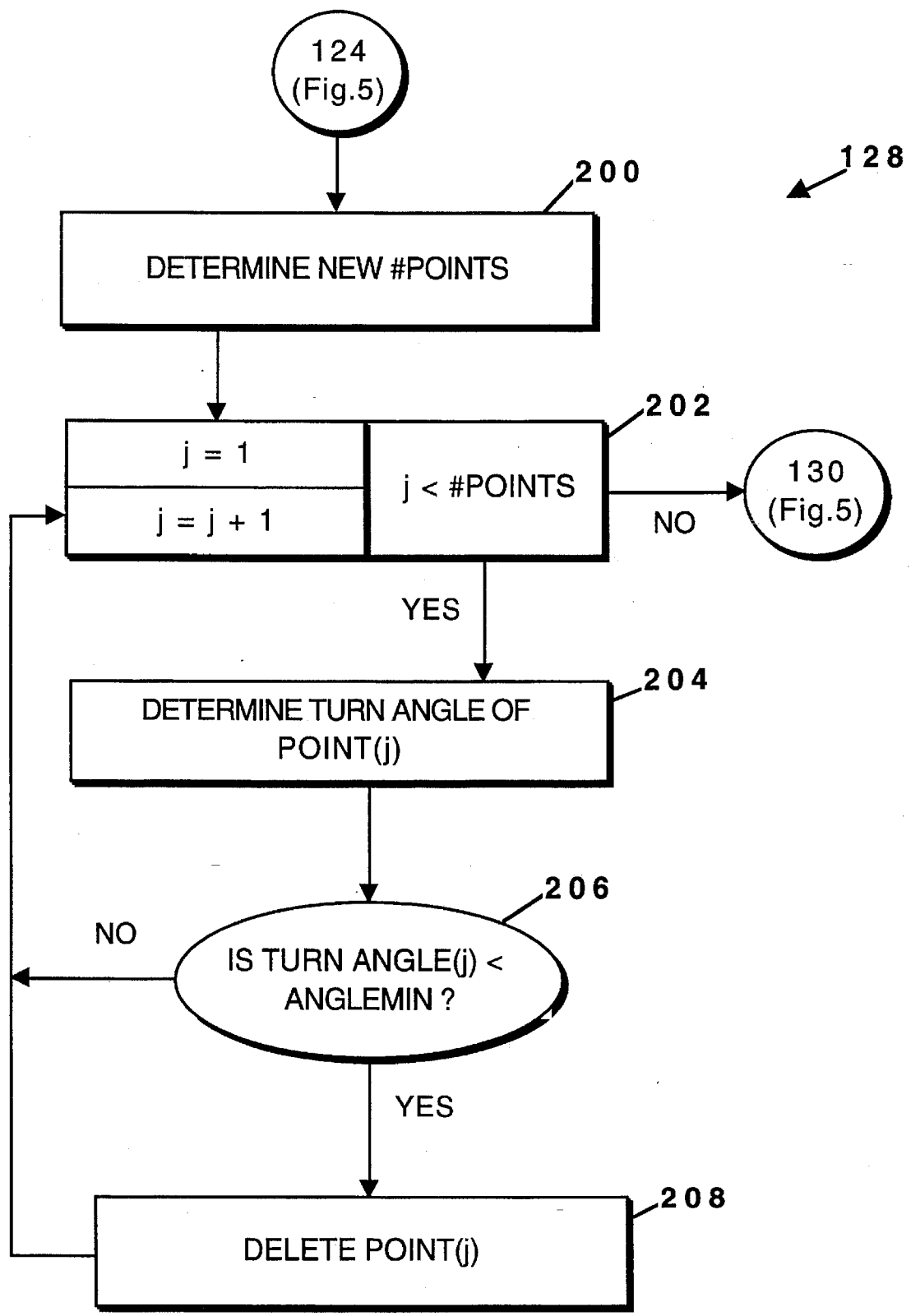
FIG. 8 is a flow diagram illustrating a method of removing small variations in the direction of a stroke to facilitate gesture recognition.

Turning next to FIG. 6, the corner identification technique of step 120 will be described in further detail. Conceptually, an imaginary line is drawn between the first and last points in the stroke. Then the remaining points in the stroke are compared to the position of the imaginary line to determine which point is furthest from the line. If the point that is furthest from the line is more than a predetermined offset distance away from the imaginary line, then it is defined as a corner point. The process is then recursively repeated on each line segment until a set of processed points is developed wherein none of actual points on the line segment input by the user are further than the predetermined threshold offset distance from the adjacent line between corner points. The mathematical technique used to implement this approach is an "Iterative End-Point Fits Process" described by Duda & Hart in their text *Pattern Classification and Scene Analysis*, published by John Wiley & Sons, 1973. Naturally, the appropriate threshold offset distance will vary somewhat depending upon the particular system. In the hand held pen-based computer system of the described embodiment, a suitable threshold offset distance is in the range of 2 to 6 pixels with 4 pixels being a representative appropriate offset. It is sometimes desirable to vary the length of the offset based upon the size of the stroke.

As seen in FIG. 6, the technique begins at step 160 where the first and last points of the initial segment that is to be processed looking for a corner (Current Segment) are set to the first and last points of the entire stroke. Then in step 162, the CPU 12 determines the equation for an imaginary connecting line that extends between the first and last points of the current segment. After the imaginary line has been calculated, the value MAXDEV is set to zero in step 164. In the loop that follows in steps 166–170, the value MAXDEV will be used to store the distance of the point that is farthest from the imaginary line. In step 166 a loop is initiated to determine which point is furthest from the imaginary line. A counter "i" is set to the value of the first point in the current segment plus one. Thus, the initial point that is checked is the point that is next to the first point. In step 168, the distance DIST from point (i) to the imaginary connecting line is calculated. Then in step 170, the value calculated for DIST is compared to the value MAXDEV. If the value of DIST is greater than MAXDEV, then the point (i) is the furthest point from the imaginary line that has been calculated so far, and the value MAXDEV is reset to equal DIST and a value iMAX is set equal to the current counter value "i". Thereafter, the logic loops back to step 166 where the counter "i" is incremented and the incremented counter value is compared to the point number of the last point in the current segment. As long as the value of counter "i" is less than the point number of the last point in the current segment, the loop including steps 168 and 170 is repeated. In this manner, the point furthest from the imaginary line can be readily determined.

After all of the intermediate points have been checked, the value of counter "i" is incremented to the number of the last point in the current segment and the logic moves to step 172 where it determines whether MAXDEV is greater than a predetermined threshold as described above. If so, point iMAX is designated as a corner and two line segments that are created between the corner and the respective first and last points of the current segment are created in step 174. Then in step 176, the first of the new line segments is set to the current line segment and the second new line segment is saved for a recursive analysis at a later point. After step 176, the logic returns to step 162 where the process is repeated until the value MAXDEV of a particular line segment is less than or equal to the predetermined threshold value.

When the value MAXDEV associated with a particular line segment is less than or equal to the predetermined threshold value, the first and last points of the current segment are marked as corners in step 178. Then in step 180, the logic checks to determine whether there are any unexamined segments. If not, the logic proceeds to the small segment removing step 124 (in FIG. 5). If there is an unexamined segment, the first and last points of the current segment are set to equal the first and last points of the next unexamined segment (step 182). Then the logic returns to step 162 where the entire process is repeated until the entire stroke has been broken into small enough line segments so that none of the line segments deviate from the original stroke by more than the predetermined threshold offset. As indicated above, after the stroke shown in FIG. 13(*a*) has been processed for corner definition, it may take the appearance of the processed stroke shown in FIG. 13(*b*). It is noted that the processed stroke constitutes a series of corner points.

After the corner points have been defined in step 120, any line segments that are very small are merged with adjacent line segments in step 124. The small segment removing step 124 will be described next with reference to FIG. 7. Initially, in step 185, the total number of points that were defined in the corner finding step 120 is determined. In practice, it is easiest to maintain a counter which counts the total number of points, #points that are in the processed stroke. The counter can be initialized an incremented in step 120 as the various end points and corners are being defined. After the number of points have been defined, a loop is set up which measures the distance between each adjacent pair of points. The loop begins in step 187 with the starting point being point (0). Thus a counter "j" is initialized to zero. Then in step 189, the distance DIST between two adjacent points [e.g. point (j) and point (j+1)], is determined. If the distance DIST is greater than or equal to a predetermined minimum distance MINDIST, then the logic returns to step 187 where the counter "j" is incremented by one and the loop is repeated. On the other hand, if the distance DIST is less than the predetermined minimum distance MINDIST, then the logic moves to step 193 where it calculates the turn angle of point (j) [Turn Angle (j)]. Of course, the appropriate value for MINDIST can vary a great deal depending upon the nature of the objects being deleted, the screen size, etc. For the hand held pen-based computer system of the described embodiment, the applicant has found a value of 8 pixels to work well. This, again, can vary based upon the size of the stroke.

In step 193, the logic calculates the number of degrees that the processed stroke turns at point (j). Thereafter, in step 195 the turn angle of point (j+1) is calculated. After the turn angles of both points have been calculated, the point that has the smaller turn angle is deleted in step 197. That is, if Turn Angle (j) is less than Turn Angle (j+1), then point (j) is deleted. If not, point (j+1) is deleted. The only exception to this is that the end points are never deleted. After one of the points associated with a small line segment is eliminated, the logic loops back to step 187 where the counter "j" is incremented and the incremented value is compared to #points. If "j" is less than the value #points, then the loop is repeated. For the purposes of the flow diagram shown in FIG. 7, when a point is deleted, the remaining point is considered point (j+1). If the value of counter "j" is incremented so that it equals #points, then the small segment removing step 124 is completed and the logic proceeds to step 128. As indicated above, after the processed stroke shown in FIG. 13(b) has been further processed to remove small line segments, it may take the appearance of the processed stroke shown in FIG. 13(c).

After the small line segments have been removed in step 124, any remaining points that have a turn angle that is smaller than a predetermined minimum turn angle are eliminated as well. Step 128. This step will be described in more detail with reference to FIG. 8. Initially, in step 200, the number of points (#points) that remain after the small segment have been removed are counted. Then, in steps 202–208, a loop is created which eliminates the corners that have small turn angles. Initially, in step 202, the loop is created and a counter "j" is set equal to one. Then in step 204, the logic determines the turn angle of point(j) [Turn Angle(j)]. In step 206, the calculated Turn Angle(j) is then compared to a predetermined minimum turn angle ANGLEMIN. If the turn angle of the current point is less than the predetermined minimum turn angle, then point(j) is deleted in step 208. Otherwise, the logic loops back to step 202 where the counter "j" is incremented by one. Similarly, after a point is deleted in step 208, the logic loops back to step 202 to increment the counter "j". After the counter has been incremented, it is compared to the value #points. So long as the value in counter "j" is less than #points, the loop continues. On the other hand, if the value of counter "j" is not less than the value of the #points, the loop is terminated and the logic proceeds to step 130 as seen in FIG. 5. As indicated above, after the processed stroke shown in FIG. 13(c) has been further processed to remove the corners associated with small turn angles, it may take the appearance of the processed stroke shown in FIG. 13(d).

Figure 3D:
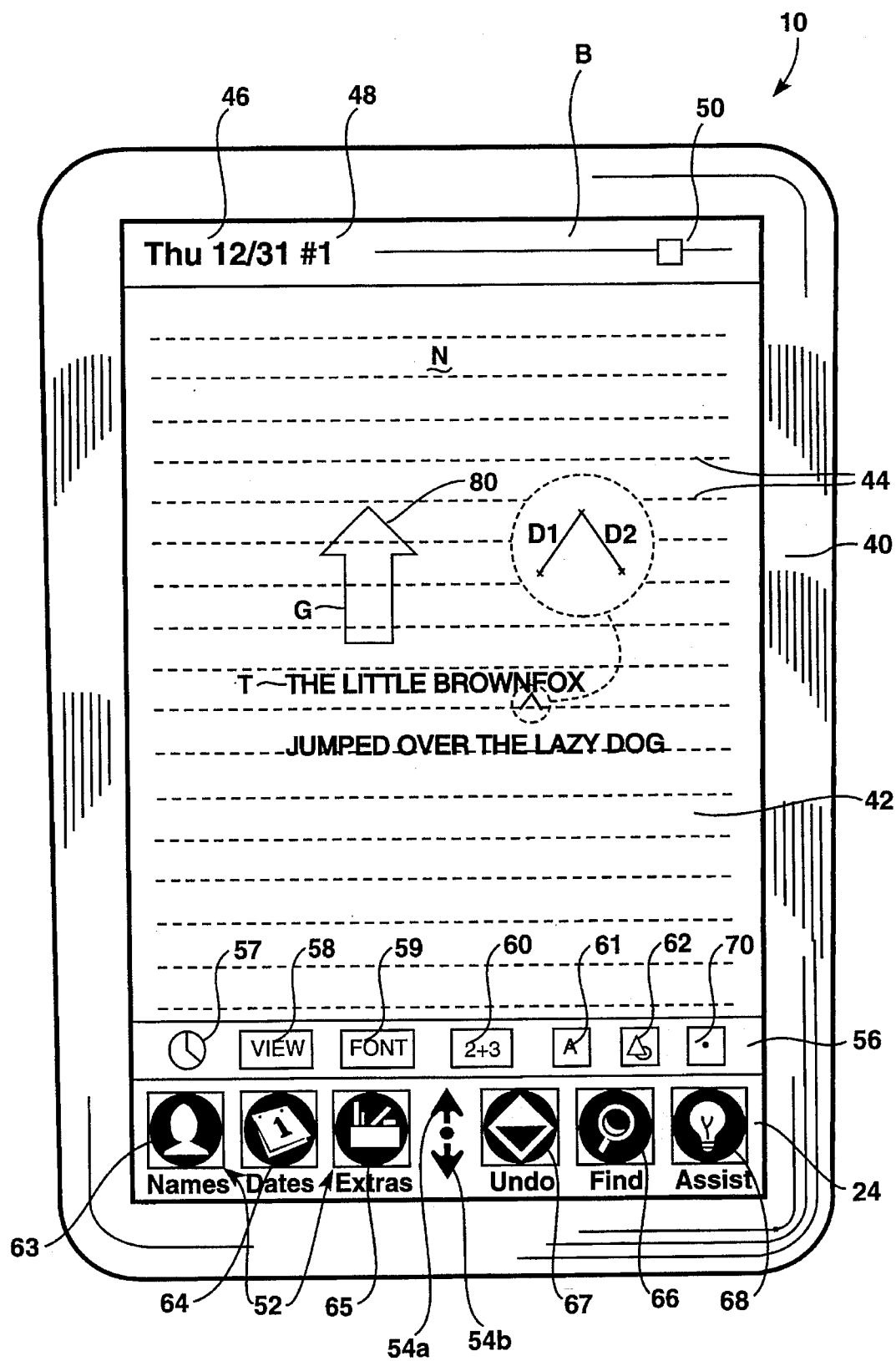
FIG. 3(d) illustrates the screen display of FIG. 2 with a caret gesture made between two characters of the text.
Figure 3E:
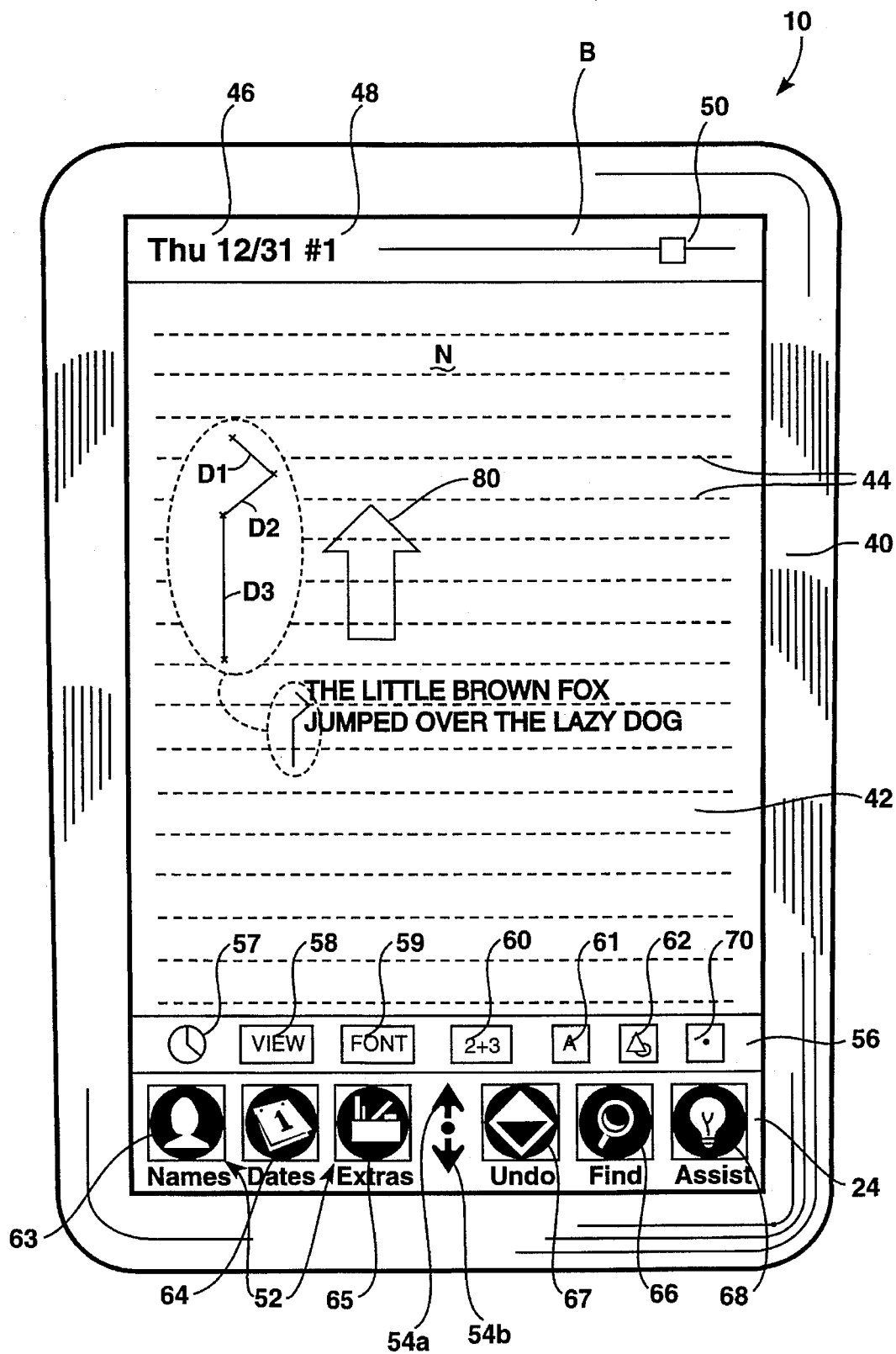
FIG. 3(e) illustrates the screen display of FIG. 2 with an open space gesture made between two lines of the text.
Figure 9:
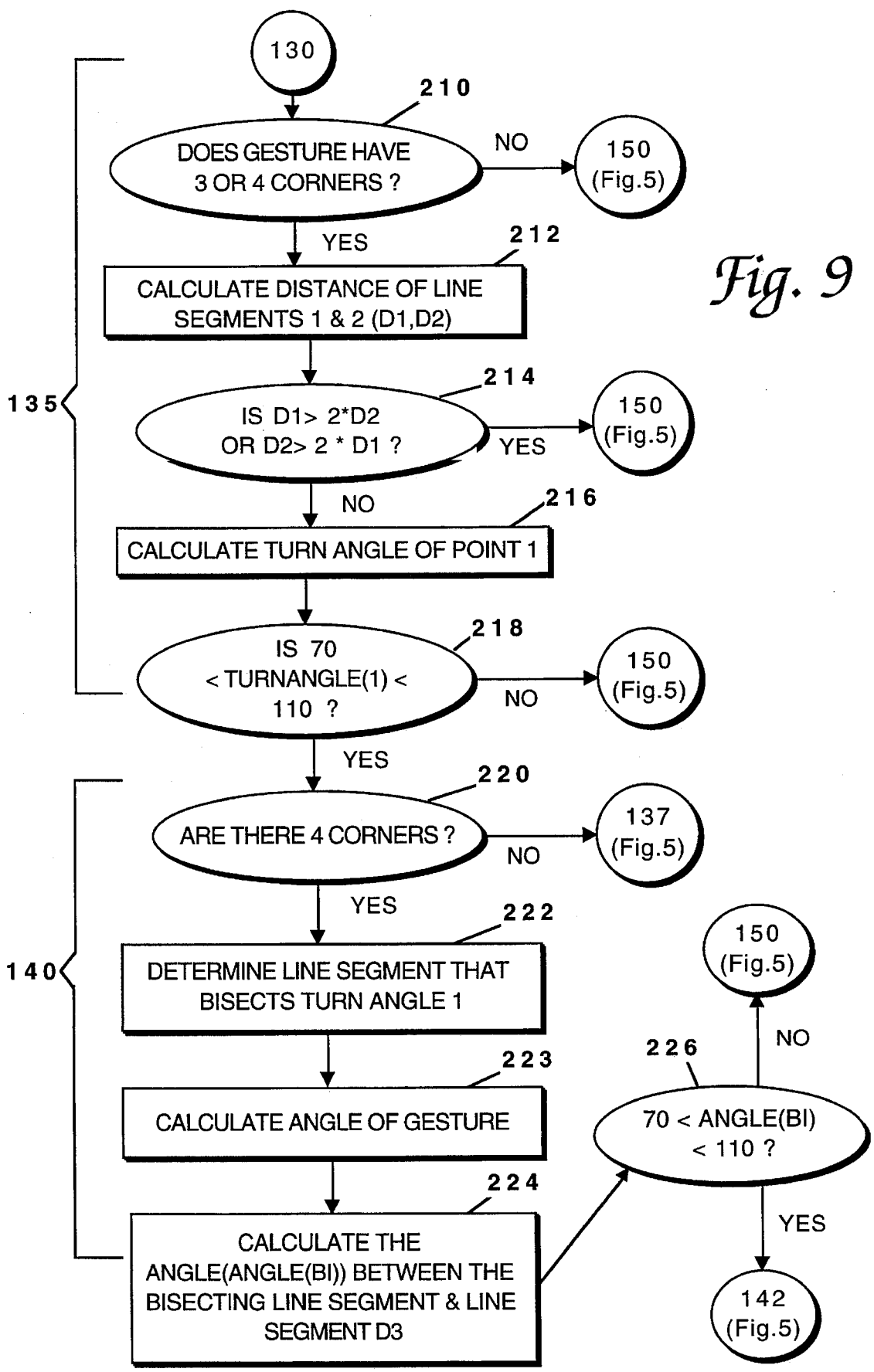
FIG. 9 is a flow diagram illustrating a method of determining whether a gesture is a caret or an open space gesture.

Referring next to FIG. 9, a method of determining whether the gesture is a caret or an open space gesture will be described. Initially, in step 210, the logic checks to determine whether the processed stroke has exactly 3 or 4 corners, including the end points. If so, the logic moves to step 212 where it calculates the length of line segments D1 and D2 (as seen in FIGS. 3(d) and 3(e)). If not, the logic jumps to step 150 where it determines whether the stroke is a scrub gesture.

In step 212, line segment D1 is the length between the starting point [point(O)] and the first corner [point(1)] while line segment D2 is the length between the first corner [point(1)] and the second corner [point(2)]. After the length of line segments D1 and D2 have been calculated, they are compared in step 214. Specifically, if either D1 or D2 is more than twice as long as the other, then the stroke cannot be considered to be either a caret or an open space gesture and the logic jumps to step 150. On the other hand, if the two legs are close to the same length, the logic moves to step 216 where the turn angle of point (1) (i.e. the first corner after the starting point) is calculated. Then in step 218, the turn angle is checked to determine whether it falls within a predetermined range. Of course, the actual turn angles that are accepted may vary depending upon the requirements of a particular system. However, by way of example, a range of approximately 70–110 degrees has been found to be suitable for the hand-held pen-based computer system of the described embodiment.

If the turn angle is not within the designated range, then the gesture is considered not to be a caret or an open space gesture and the logic skips to step 150 where it determines whether the gesture is a scrub gesture. When the turn angle is within the designated range, the logic moves to step 220 where it determines whether the gesture has exactly four corner points. If not, then the stroke has three points and has been determined to be a caret gesture. Thus, the logic moves to step 137 where it processes the caret gesture. In written text this would amount to inserting a single space in the text. On the other hand, if the gesture has four points, it has the potential to be an open space gesture and the logic moves to step 222.

In step 222, the equation for the line segment that bisects Turn Angle (1) is calculated. Next, in a step 223, the angle of the gesture is calculated. An angle is returned with each recognized gesture so that vertical and horizontal "open space" gestures can be differentiated, and so that characters such as a "V" can be ignored. Then, in step 224, the angle [Angle(BI)] between the bisecting line segment and line segment D3 (shown in FIG. 3(e)) is calculated. Then in step 226, Turn Angle (BI) is checked to determine whether it falls within a predetermined range. As with Turn Angle (1) discussed above, the actual turn angles that are accepted may vary depending upon the requirements of a particular system. However, by way of example, a range of approximately 70–110 degrees has been found to be suitable for the hand-held pen-based computer system of the described embodiment. If the turn angle is not within the designated range, then the gesture is considered not to be an open space gesture and the logic skips to step 150 where it determines whether the gesture is a scrub gesture. When the turn angle is within the designated range, the logic moves to step 142 (as seen in FIG. 5) where the open space gesture is processed and executed.

Figure 10:
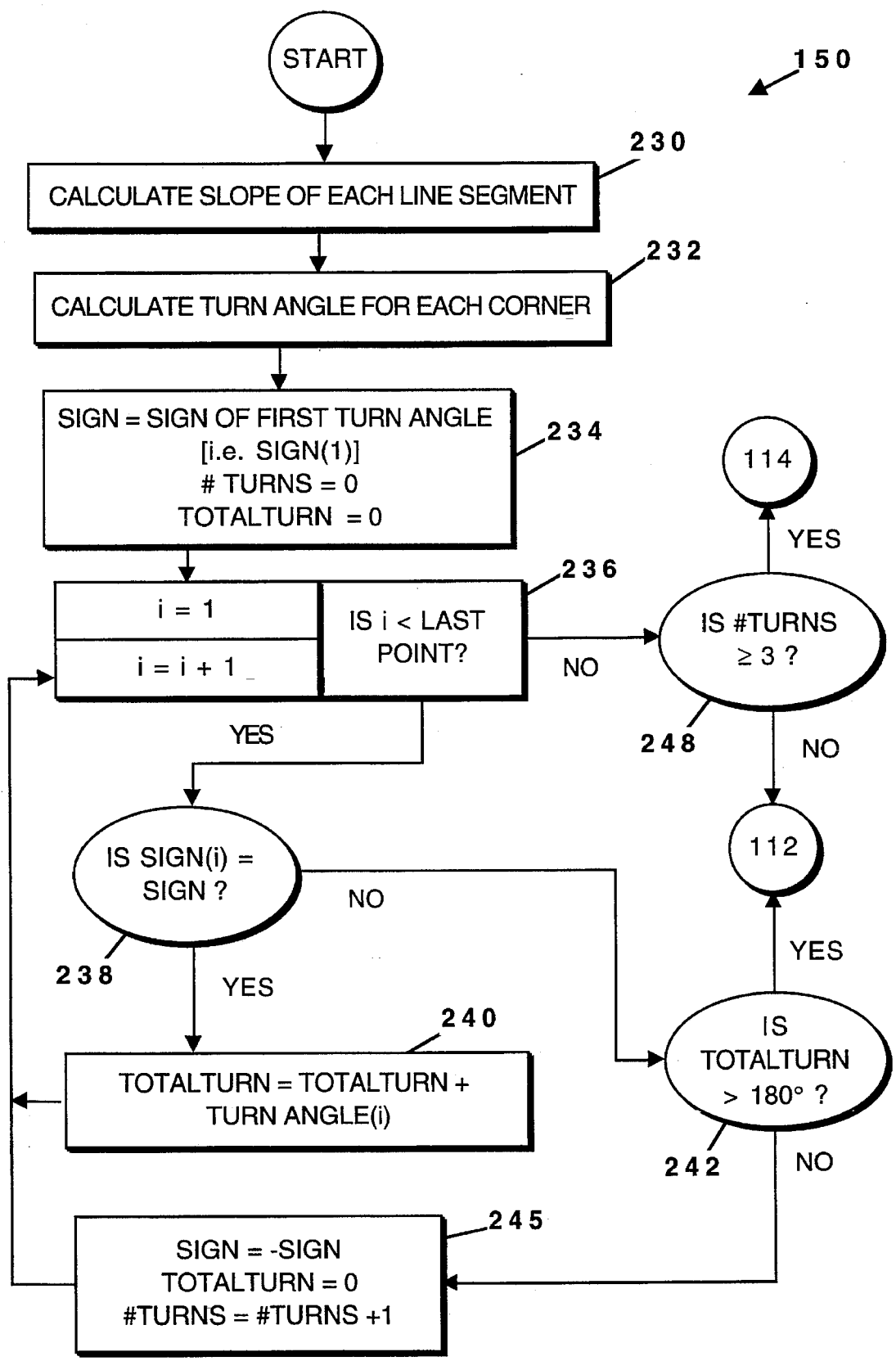
FIG. 10 is a flow diagram illustrating a method of determining whether a gesture is a scrub gesture.

Referring next to FIG. 10, the method 150 of determining whether the processed stroke is a scrub gesture will be described in more detail. Initially, in step 230, the slope of each line segment is calculated. Then in step 232, the turn angle for each corner is calculated. In step 234 a variety of variables are set. Initially, the variable SIGN is set to the sign of the first turn angle. That is, either +1 or −1. Further, the variables #TURNS and TOTALTURN are set to zero.

In step 236 a loop is initialized with its counter being set to one. The loop will continue until the counter is equal to the number of the last point in the processed stroke. The actual loop begins in step 238 where the logic determines whether the sign of turn angle "i" is equal to the value stored in variable SIGN. If so, the logic proceeds to step 240 where the variable TOTALTURN is set equal to the old value of TOTALTURN plus the value of TURN ANGLE (i). Thereafter, the logic loops back to step 236 where the counter "i T" is incremented by one and the loop is repeated.

When the logic determines that the sign of TURN ANGLE (i) is not equal to SIGN(i) in step 238, then the logic proceeds to step 242 instead of step 240. In step 242 the logic first determines whether the value TOTALTURN is greater than 180 degrees. If so, the stroke has doubled back upon itself and is therefore not considered a scrub gesture and the logic proceeds to step 112 (in FIG. 4) where it interprets and processes the stroke as something other than a scrub gesture.

When the value of the variable TOTALTURN is less than 180 degrees, the logic proceeds to step 245 where several of the variables are reset. Specifically, the variable SIGN is set equal to its negative. The variable TOTALTURN is reset to zero and the variable #TURNS is incremented by one. Thereafter, the logic loops back to step 236 where the counter "i" is incremented by one and the loop is repeated. If in step 236 the value of counter "i" is not less than the number of the last point in the processed stroke, then the loop is completed and the logic moves to step 248 where it determines whether the total number of turns is greater than or equal to three. If so, a potential scrub gesture has been identified and the logic proceeds to step 114 where it determines whether there are any selected items. On the other hand, if the stroke does not have at least three turns, then the stroke is not a scrub gesture and the logic moves on to step 112 where it attempts to interpret and process the stroke in accordance with the constraints of the system.

Figure 11:
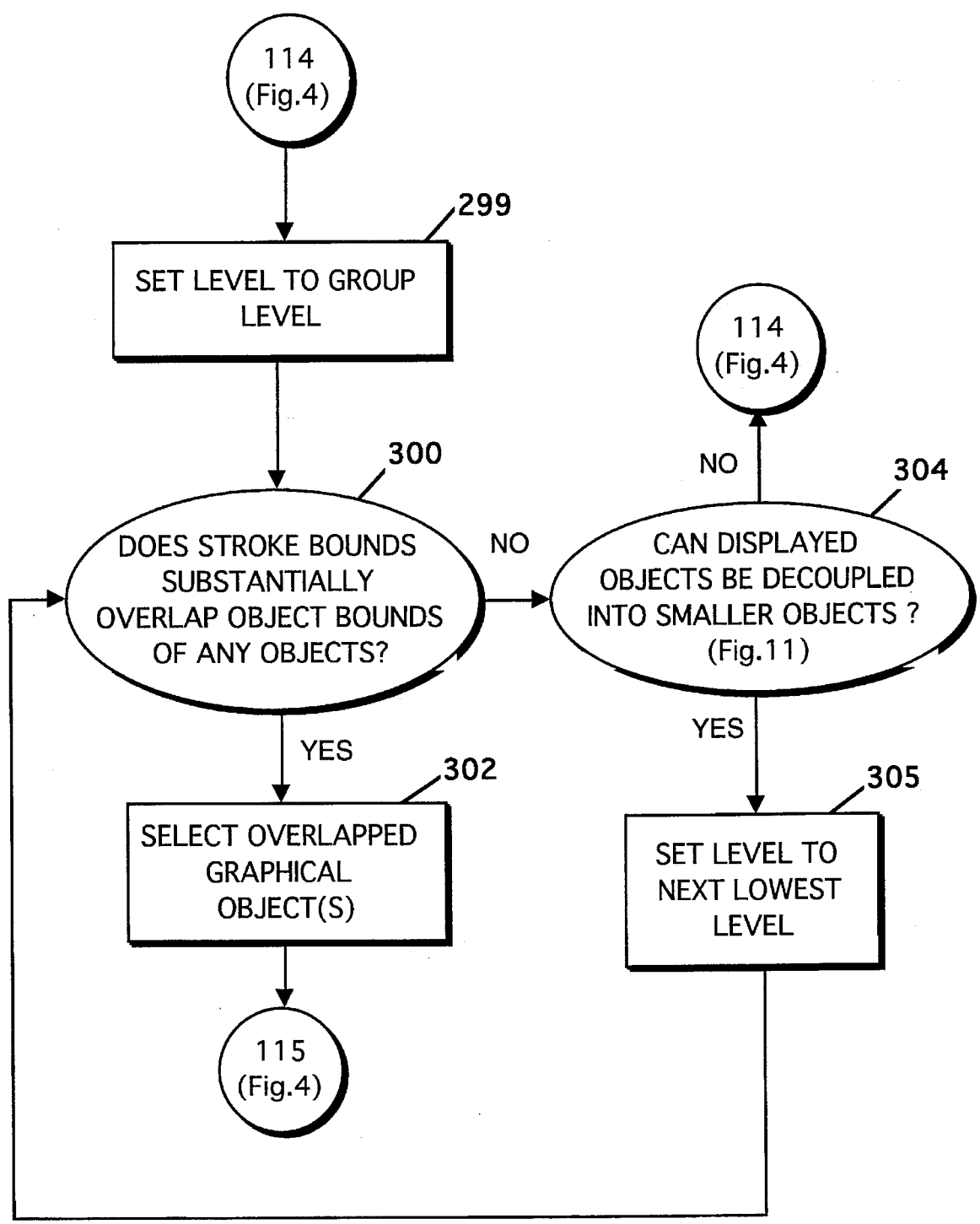
FIG. 11 is a flow diagram illustrating a method of determining whether a scrub gesture should delete any objects.

Referring next to FIG. 11, the step 116 of determining whether a stroke has selected any objects will be described in more detail. Initially, in step 299, a level indicator is set to the group level as discussed in greater detail subsequently. Then in decision step 300, the logic determines whether the bounding box of the stroke (STROKE BOUNDS) substantially overlaps the bounding box of a given object (OBJECT BOUNDS). When checking for overlap, the logic will begin by checking the highest level objects. As indicated below, in the described embodiment, the highest level objects are groups, which may include both text and graphic material that have been grouped together by the user. Thus, the logic first checks to determine whether any object groups have been substantially overlapped by the scrub gesture.

Substantial overlap can be set at a given percentage overlap, as for example 80%. That is, in the given example, substantial overlap occurs when STROKE BOUNDS overlap at least 80% of the boundary of a given object, or if the boundary box of the objects overlaps at least 80% of STROKE BOUNDS. Of course, the actual percentage overlap may be widely varied in accordance with the needs of a particular system. If the result of the decision step 300 is that there is substantial overlap, then the object(s) that is/are substantially overlapped by the scrub gesture will be selected in step 302 and deleted in step 115.

If the result of decision step 300 is that there is not any substantial overlap at the current (group) level, then in step 304 the logic determines whether the displayed objects can be decoupled into smaller objects. If not, the object selection determining step 116 has been completed and no objects have been selected. In this circumstance, the logic moves to step 112 where it attempts to interpret and process the stroke as something other than a scrub gesture. When the object(s) can be decoupled into smaller objects, then the level checking counter is set to the next lower level in step 305 and step 300 is repeated looking at the next lower level item. This procedure is repeated until the displayed objects have been reduced to their smallest elements. In text, the smallest element is a single character. In graphics, the smallest element is a single vertex.

In the described embodiment, the highest order object is a group. A group may contain both text and graphic material. Below the group level, objects are broken into text and graphics. The highest level text item is a paragraph. The highest level graphic item is a polygon. The second level is a word in textual material and a segment in graphic items. Finally, the smallest level items are characters in textual materials and a vertex in graphics. Although these object priority levels are used in the described embodiment, additional or alternative levels could be used as well. For example, in textual materials, pages and sentences would also be very suitable orders for differentiation.

If there is no substantial overlap on the group level, then the logic checks the highest level of both textual and graphic information. As indicated above in the described embodiment, the highest level of textual information is the paragraph and the highest level of graphic information is the polygon. It is noted that the term polygon is a bit of a misnomer since as will be apparent to those skilled in the art of object oriented graphics software development, independent lines, circles and various other objects would each be considered a polygon for the purpose of this test. If one or more paragraphs and/or polygons are substantially overlapped by the bounding box of the scrub gesture, then those items will be selected in step 302 and then deleted in step 115. If the bounding box STROKE BOUNDS of the scrub gesture does not substantially overlap a paragraph or polygon, then in step 304, the logic determines that the object(s) can be decomposed into smaller objects, which in this case would be words for textual materials and segments for graphic items. Then the substantial overlapping step 300 is repeated looking at the words and segments.

If the scrub gesture substantially overlaps a word or segment, then the overlapped object(s) are selected and deleted in steps 302 and 115, respectively. However, if the stroke does not substantially overlap either a word or a segment, then step 300 is repeated looking at the characters and vertices. Again, if the scrub gesture substantially overlaps a character or vertex, then the overlapped object(s) are selected and deleted in steps 302 and 155. It is noted that when a vertex of a graphic item is deleted, then the graphic item will be withdrawn eliminating the scrubbed vertex. Thus, for example, if a vertex of a square is removed, the resulting graphic item would be a isosceles triangle and so forth. If the scrub gesture does not substantially overlap a character or vertex, then in step 304 the logic determines that the object(s) cannot be decomposed into smaller units and the process is completed without anything being scrubbed. At that point, the logic proceeds to step 112 where it interprets and processes the stroke as something other than a scrub gesture.

In the described embodiment, once the stroke has been found to overlap an item, it will check all other items at that level before scrubbing. After the scrub operation, the logic returns to step 102 where it looks for the next user input. When determining overlap, in decision step 300, the logic first looks at the highest level objects. If one or more objects at the highest level are substantially overlapped, then they will be deleted and the scrubbing process is completed. Thus, once a scrub has been made, no further checking occurs to determine if lower level items are substantially overlapped as well. The process of determining whether a stroke overlaps a particular object is described in more detail in the parent application referenced above.

In alternative embodiments, it would be possible to search for lower level overlaps as well. If none of the highest level objects are substantially overlapped, then all of the items at the second level are examined and the process is repeated on each level until an overlapping object is found or the lowest level items have been examined. In the described embodiment textual and graphical objects have parallel priority levels. Thus, at each level, both textual and graphic objects will be checked. In alternative embodiments, the various textual and graphical levels can be prioritized in any suitable sequence.

Figure 4:
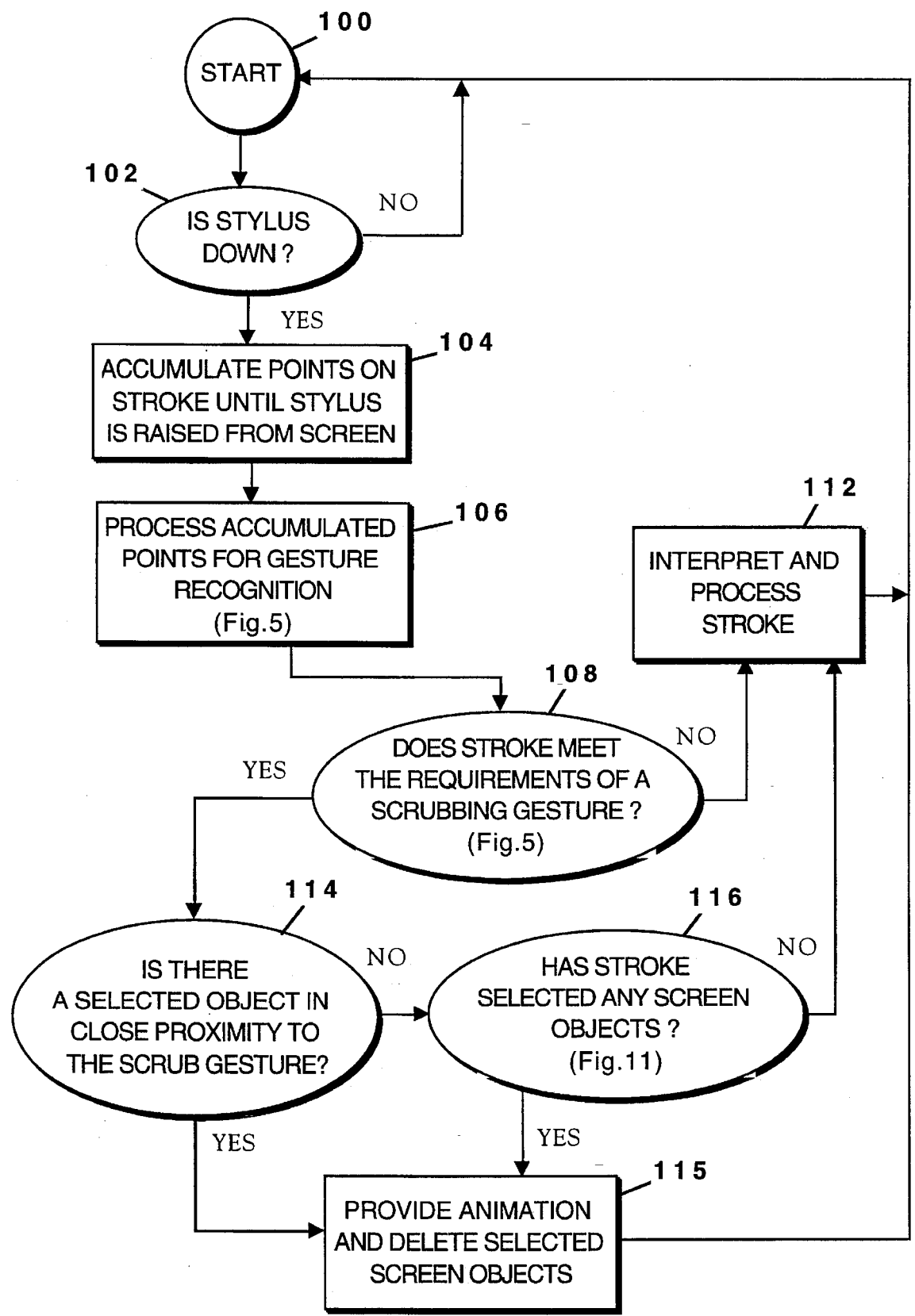
FIG. 4 is a flow diagram illustrating a method of recognizing a scrub gesture and deleting objects selected by the scrub gesture.
Figure 14:
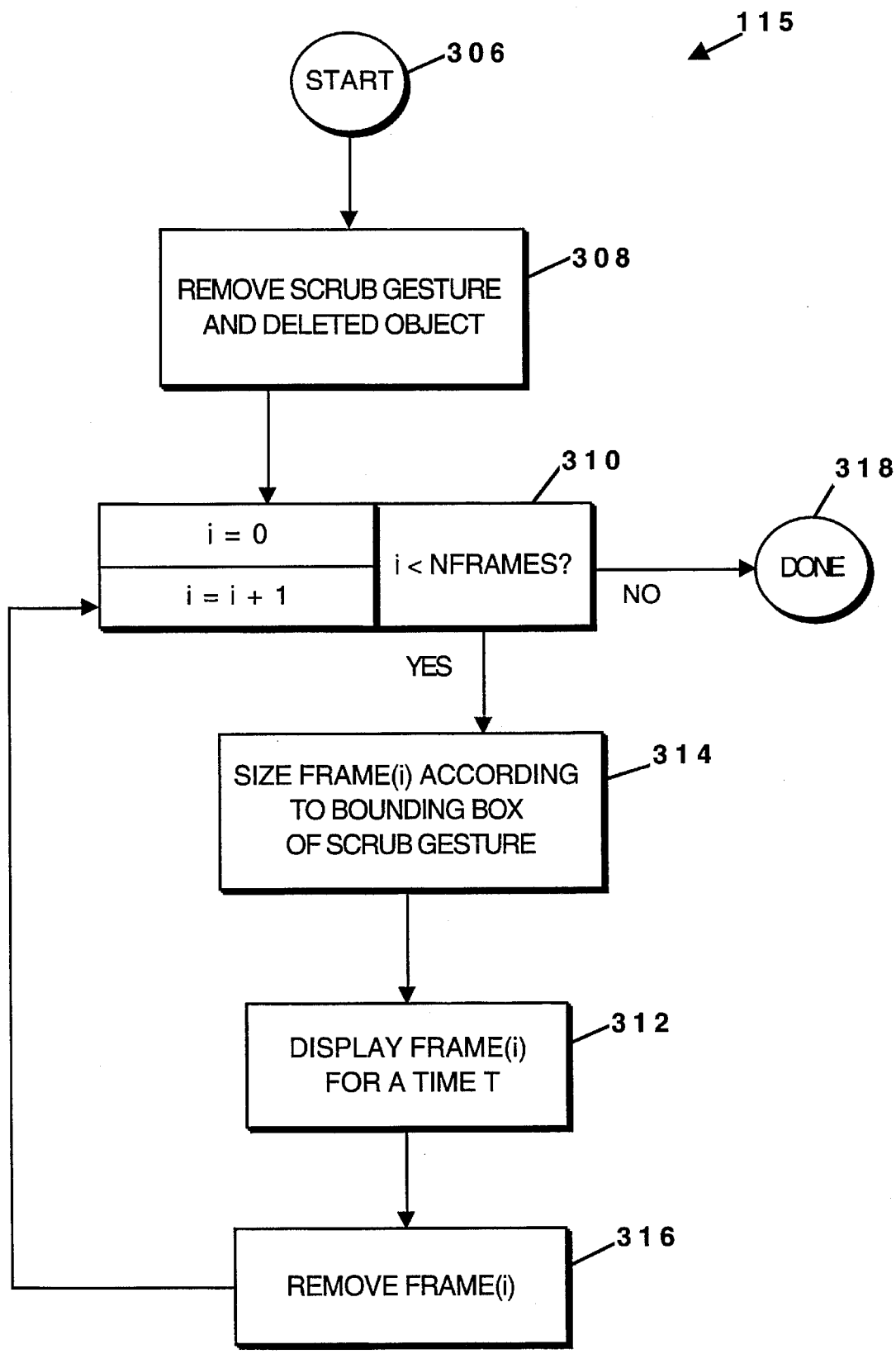
FIG. 14 is a flow diagram illustrating a method for animating a deletion process in accordance with step 115 of FIG. 4.
Figure 15A:
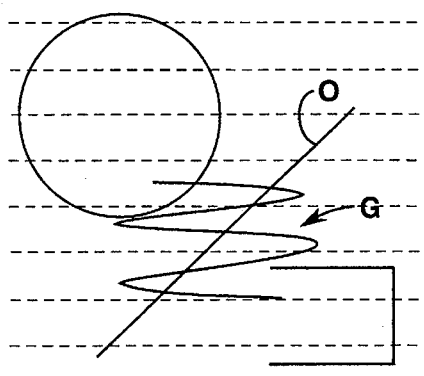
FIGS. 15a–15e are used to illustrate the process of FIG. 14.
Figure 15B:
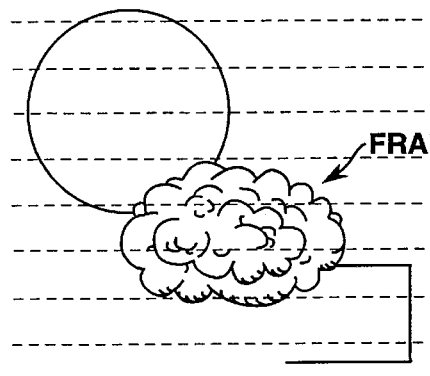
Figure 15C:
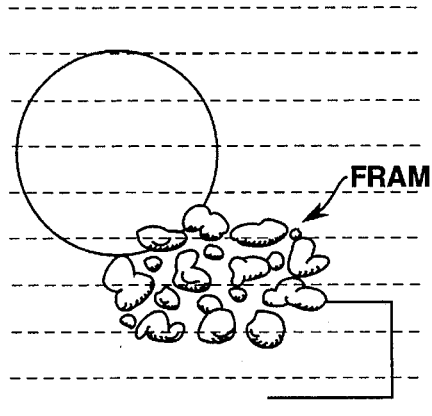
Figure 15D:
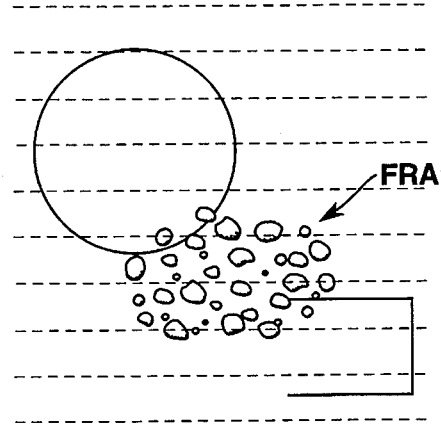
Figure 15E:
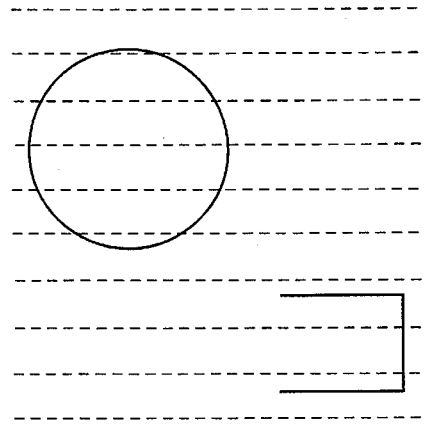

FIG. 14 illustrates step 115 of FIG. 4 in greater detail. Process 115 starts at 306 and, in a step 308, a scrub G and an object O selected for removal by the scrub G are removed from the screen (see FIG. 15a). In an iterative loop step 308, a counter i is initialized to zero, and is compared with a variable NFRAMES, which is equal to the number of frames of the subsequent animation. In this example, NFRAMES= 3. Next, in a step 312, FRAME(I) is sized to fit the bounding box of the deleted gesture G. Alternatively, FRAME(I) can be sized to fit the bounding box of the deleted object O, or can be otherwise be appropriately sized. In step 314, FRAME(i) is displayed on the screen 42 of computer system 10 for a period of time T. FRAME(O) is illustrated in FIG. 15b as a continuous cloud-like structure, such as a thick cloud of smoke. A suitable period of time T is a fraction of a second, e.g. ¼ of a second. Next, in a step 316, the FRAME(i) is removed from the screen 42. Process control is then returned to step 310 until all of the frames of the animation have been displayed for a period of time T. FRAME(1) is illustrated in FIG. 15c as a partially broken cloud, and FRAME(2) is illustrated in FIG. 15d as a severely broken cloud. After the iterative loop 310 is completed, the process is completed as indicated at 318, and the screen will appear as shown in FIG. 15e. The animation of the deletion provides immediate, sure, and pleasing user feedback of the delete function. The order of the steps is somewhat arbitrary: e.g. the scrub gesture G and object O could be deleted after the animation sequence rather than before the sequence, the object O could be deleted after the animation sequence while the gesture G is deleted before the animation sequence, etc.

Alternatively, images other than the cloud-like structure shown in FIG. 15b–d can be displayed and animated for a deletion, such as an explosion, a star burst, etc. In other embodiments, only one frame or image can be displayed when an object O is deleted to quickly indicate to the user that the deletion has taken place.

Although only one embodiment of the present invention has been described in detail herein, it should be understood that the present invention may be embodied in many other specific forms without departing from the spirit or scope of the invention. For example, the computer system, on which the described scrubbing method is implemented may be varied widely. Additionally, the particulars of the scrub gesture parameters may be widely varied in accordance with the present invention. For example, in the described embodiment, there is no limitation on the turn angle of the scrub gesture other than it can not double back upon itself. However, in alternative embodiments more precise scrub gesture turn angle requirements could be used. Similarly, in the described embodiment, the gesture shown in FIG. 12(d) is invalid due to the loops. In alternative embodiments, larger loops at the turning points may be considered valid scrub gestures. Further, the algorithms described are exemplary in nature and may be widely varied within the scope of the invention. From the foregoing, it should be apparent that the present examples are to be considered as illustrative and not restrictive and the invention is not to be limited to the details given herein, but may be modified within the scope of the appended claims.

What is claimed is:

1. A method of deleting information displayed on a screen associated with a computer system, the method comprising the steps of:

detecting a pointer created stroke input onto the display screen, the stroke being defined as a series of points;

processing the stroke for scrub gesture recognition, the stroke processing steps including the substeps of defining a multiplicity of corners in the stroke, removing selected corners that have an associated turn angle that is less than a predetermined angle, and removing selected corners that are associated with segments that are shorter than a designated length;

determining whether the processed stroke meets the path definition requirements of a scrub gesture based upon characteristics of the processed stroke itself and without comparing the processed stroke to stored stroke objects, and said scrub determining step includes the substep of determining whether the number of times that the processed stroke changes the direction of its turn angles exceeds a predetermined number;

determining whether an object displayed on the screen is selected when the stroke is determined to meet the path definition requirements of a scrub gesture; and deleting the selected object if the processed stroke meets the requirements of a scrub gesture and an object is selected for deletion.

2. A method as recited in claim 1 wherein the corner defining step includes an Iterative End-Point Fits Process.

3. A method as recited in claim 1 wherein the short segment corner removing step requires that when the distance between adjacent corners is less than the designated length, one of the corners associated with the short line segment will be eliminated.

4. A method as recited in claim 3 wherein when a corner associated with a short segment is to be eliminated, the corner having a smaller turn angle associated therewith will be eliminated.

5. A method as recited in claim 1 wherein the scrub gesture determining step includes the step of determining whether the processed stroke is a caret gesture.

6. A method as recited in claim 1 wherein the scrub gesture determining step includes the step of determining whether the processed stroke is a caret with a trailing line gesture.

7. A method as recited in claim 1 wherein the scrub gesture determining step includes the step of determining whether the processed stroke is a line gesture.

8. A method as recited in claim 1 wherein the selected object determining step includes the step of determining whether the scrub gesture substantially overlaps a displayed object wherein the object that is substantially overlapped is selected for deletion.

9. A method as recited in claim 1 wherein the selected object determining step includes the step of determining whether any objects were selected at the time the scrub gesture was made.

10. A method as recited in claim 1 wherein the corner defining, small segment removing and small turn angle removing steps are conducted sequentially in the stated order.

11. A method as recited in claim 1 wherein when a corner associated with a short segment is to be eliminated, the corner having a smaller turn angle associated therewith will be eliminated.

12. A method as recited in claim 11 wherein the corner defining substep includes an Iterative End-Point Fits Process.

13. A method of deleting information displayed on a screen associated with a computer system, the method comprising the steps of:

detecting a pointer created stroke input onto the screen;

processing the stroke for scrub gesture recognition;

determining whether the processed stroke meets the path definition requirements of a scrub gesture based upon characteristics of the processed stroke itself, the scrub gesture determining step includes the substep of determining whether the number of times that the processed stroke changes the direction of its turn angles exceeds a predetermined number, wherein the stroke will not be considered a scrub gesture unless the predetermined number of direction changes is exceeded and wherein the predetermined number is at least three;

determining whether an object displayed on the screen is selected when a stroke that meets the path definition requirement of a scrub gesture is identified; and deleting the selected object if the processed stroke meets the requirements of a scrub gesture and an object is selected.

14. A method as recited in claim 13 wherein the scrub gesture determining step includes the substeps of:

calculating the turn angle of each corner;

adding the sum of the turn angles of all of the sequential corners that turn in the same direction; and checking to determine whether any of the sums of the turn angles of all of the sequential corners that turn in the same direction exceed a predetermined total, wherein the stroke will not be considered a scrub gesture when the predetermined total is exceeded.

15. A method of deleting information displayed on a screen associated with a computer system, the method comprising the steps of:

detecting a pointer created stroke;

processing the stroke for scrub gesture recognition, the stroke processing step including the substeps of defining a multiplicity of corners in the stroke, removing selected corners that are associated with segments that are shorter than a designated length, and removing selected corners that have an associated turn angle that is less than a predetermined angle;

determining whether the processed stroke meets the path definition requirements of a scrub gesture, wherein the scrub gesture determining step includes the substeps of, determining whether the number of times that the processed stroke changes the direction of its turn angles exceeds a predetermined number, wherein the stroke will not be considered a scrub gesture unless the predetermined number of direction changes is exceeded and wherein the predetermined number is at least three, and adding the sum of the turn angles of all of the sequential corners that turn in the same direction and checking to determine whether any of the sums of the turn angles of all of the sequential corners that turn in the same direction exceed a predetermined total angle that is no more than approximately 180 degrees, wherein the stroke will not be considered a scrub gesture when the predetermined total angle is exceeded;

determining whether an object displayed on the screen is one of:

preselected before the pointer created stroke is detected and located in close proximity to the pointer created stroke; or selected by the pointer created stroke through overlapping; and deleting the selected or preselected object if the processed stroke meets the requirements of a scrub gesture and an object is selected.

16. A method of deleting information displayed on a screen associated with a computer system, the method comprising the steps of:

detecting a pointer created stroke input onto the display screen, the stroke being defined as a series of points;

processing the stroke for scrub gesture recognition;

determining whether the processed stroke meets the path definition requirements of a scrub gesture based upon characteristics of the processed stroke itself and without comparing the processed stroke to stored stroke objects;

determining whether an object displayed on the screen is selected when the stroke is determined to meet the path definition requirements of a scrub gesture;

deleting the selected object if the processed stroke meets the requirements of a scrub gesture and an object is selected for deletion; and providing an animation on the screen comprising at least one frame of an image indicating deletion proximate to the former location of the object.

* * * * *